United States Patent
Milliken et al.

(10) Patent No.: US 7,831,825 B2
(45) Date of Patent: Nov. 9, 2010

(54) PACKET-BASED AND PSEUDO-PACKET BASED CRYPTOGRAPHIC COMMUNICATIONS SYSTEMS AND METHODS

(75) Inventors: Walter Clark Milliken, Dover, NH (US); Gregory Donald Troxel, Stow, MA (US)

(73) Assignees: Verizon Corporate Services Group Inc., Basking Ridge, NJ (US); Raytheon BBN Technologies Corp., Basking Ridge, NJ (US)

( * ) Notice: Subject to any disclaimer, the term of this patent is extended or adjusted under 35 U.S.C. 154(b) by 1405 days.

(21) Appl. No.: 11/076,215

(22) Filed: Mar. 9, 2005

(65) Prior Publication Data
US 2005/0210242 A1  Sep. 22, 2005

Related U.S. Application Data

(60) Provisional application No. 60/554,789, filed on Mar. 19, 2004.

(51) Int. Cl.
 *H04L 29/06* (2006.01)
(52) U.S. Cl. .................. 713/160; 713/162; 380/260
(58) Field of Classification Search .................. None
See application file for complete search history.

(56) References Cited

U.S. PATENT DOCUMENTS

| | | | |
|---|---|---|---|
| 5,319,712 A * | 6/1994 | Finkelstein et al. | 380/44 |
| 5,528,693 A * | 6/1996 | Leopold | 380/274 |
| 6,697,490 B1 | 2/2004 | Mizikovsky et al. | 380/262 |
| 7,043,022 B1 * | 5/2006 | Blanchard et al. | 380/252 |
| 7,243,202 B2 | 7/2007 | Thomas | |
| 2004/0131014 A1 * | 7/2004 | Thompson et al. | 370/230 |

* cited by examiner

*Primary Examiner*—Gilberto Barron, Jr.
*Assistant Examiner*—Virginia Ho

(57) ABSTRACT

The disclosed technology provides a system and method of securely communicating data. An encryptor located at a transmitter can provide encrypted data to the transmitter. The transmitter can maintain a packet number indicating a particular packet for carrying the encrypted data and a sub-packet number indicating a position within the packet where the encrypted data is to be stored. The encryptor can produce the encrypted data using an encryptor seed generated based on the packet number and sub-packet number. A receiver can maintain a receiver packet number indicating a number of previously received packets and can compute a receiver sub-packet number. The receiver can receive a packet containing encrypted data and can decrypt the encrypted data using a decryptor seed generated based on the receiver packet number and sub-packet number.

2 Claims, 20 Drawing Sheets

PACKET-BASED AND PSEUDO-PACKET BASED CRYPTOGRAPHIC COMMUNICATIONS SYSTEMS AND METHODS

RELATED APPLICATIONS

This application claims priority to, and incorporates by reference, the entire disclosure of U.S. Provisional Patent Application No. 60/554,789, filed on Mar. 19, 2004. This application is co-pending with a related patent application Ser. No. 11/076,216 entitled "Packet-Based And Pseudo-Packet Based Cryptographic Synchronization Systems And Methods", by the same inventors and having assignee in common, filed concurrently herewith and incorporated by reference herein in its entirety.

REFERENCE TO GOVERNMENT FUNDING

The disclosed technology received funding under U.S. Government Contract No. MDA904-03-C-0969. The Government may have certain rights in the application.

BACKGROUND (1) Field

The field of the present application relates to cryptography and, more specifically, to synchronization of cryptographic seed values at an encryptor and decryptor.

(2) Description of Relevant Art

Interest in cryptography and secure communication has increased with the growing use of electronic communication. Most electronic communication occurs over networks that are susceptible to unwanted and often undetectable monitoring, such that a private message carried across such networks can be intercepted and viewed by unintended recipients. Cryptographic systems and methods provide security against such monitoring by encrypting a message before it is placed onto a network so that the encrypted information becomes unintelligible to any recipient lacking the means to decrypt the encrypted message.

In the most basic cryptographic systems and methods, an encryptor employs an encryption method that is known to a corresponding decryptor, which employs a decryption counter-method. An example of a primitive encryption method is a codebook, which for example contains rules for replacing instances of a particular character with another character. Consider a codebook with three rules that replace occurrences of "a" with "c", "c" with "g", and "g" with "a". According to such a codebook, the word "grace" when encrypted would then become "arcge", which would seem to be unintelligible to an observer having no knowledge of the codebook rules. However, an observer having an opportunity to observe multiple encrypted words or sentences may be able to recognize patterns/repetitions in the observations and/or may be able to decipher an encrypted word based on context. For example, utilizing the same codebook, the words "he walked with grace and dignity" becomes "he welked with arcge cnd dianity", which can be more readily recognized by the context and pattern of surrounding characters. An attempt to decipher encrypted messages without full knowledge of the encryption method is known as code breaking.

As code breaking efforts have become more effective, efforts to develop more complex cryptographic systems and methods have also improved. FIG. 1 shows an encryptor 102 and a decryptor 104 that utilize a "seed" value 106 to perform their respective encryption and decryption tasks. A seed value 106 can be used to initialize an encryption method and/or can be used during an encryption method 102, such that aside from code breaking, a message 108 encrypted using a particular seed value 106 can be deciphered only if the decryptor 104 also utilizes the same seed value 106. Thus, one manner in which data security can be improved involves periodically altering the seed value 106 provided to an encryptor and a decryptor. An encryptor and a decryptor are often located remotely with respect to each other, and rather than communicating a seed value from an encryptor to a decryptor, current implementations can provide the seed values 206, 208 by independently maintaining them at the encryptor 202 and at the decryptor 204, as shown in FIG. 2, thereby decreasing the risk of an unintended recipient learning the seed values.

In modern systems, an encryptor likely may not be able to communicate directly with a decryptor and may be required to communicate through an intermediate communications mechanism, such as the computer/telecommunications network 210 shown in FIG. 2. In such systems, an encryptor 202 is located at a transmitter 212 and a corresponding decryptor 204 is located at a receiver 214. The encryptor 202 can provide encrypted data 216 to the transmitter 212 to be communicated across the network 210, and the receiver 214 can receive encrypted data 218 from the network 210 to be passed to the decryptor 204. It is well known that communications networks are unreliable in that data carried over a network may be corrupted, delayed, and/or discarded due to noise interference, equipment failure, traffic congestion, and/or other phenomena. Accordingly, the received data 218 at a receiver may not be the same as the encrypted data 216 that a transmitter intended the receiver to receive.

In some cases, the problem can be mitigated by using a receiver communications protocol that is able to recognize when such data loss/data corruption occurs. However, in other cases, a receiver 214 will not always be able to recognize when encrypted data 216 becomes lost in transmission. Further, a receiver 214 may in some instances discard data that has been corrupted. In either case, the decryptor 204 generally does not receive any notification that a problem has occurred and continues to generate seed values 208 as before. Accordingly, in case of packet loss, a decryptor 204 may inadvertently apply a particular seed value to decrypt a non-corresponding encrypted data in place of a corresponding encrypted data that was never received, which can cause subsequently received data to also be decrypted using incorrect seed values. When a decryptor uses an incorrect seed value to decipher an encrypted message, the decryptor is said to be "unsynchronized".

Existing systems and methods are available to recognize that a decryptor is unsynchronized and to perform resynchronization. The Internet Engineering Task Force defines a resynchronization mechanism for packet-based communications called Internet Protocol Security, or IPsec. The workings of IPsec are described in Request For Comments (RFC) documents RFC 2401 through RFC 2412, which are hereby incorporated herein by reference. In particular, RFC 2405 describes an encryption methodology that produces encrypted data using an initialization vector (IV) and that explicitly communicates the encrypted data together with its corresponding IV in a packet. When the packet is received at the destination, a decryptor can use the IV to decrypt the encrypted data. As another example, U.S. Pat. No. 6,697,490 to Mizikovsky et al. describes that a transmitter signature can be appended to encrypted data, and after being received at a receiver, the transmitter signature can be compared to a receiver-generated signature. Based on this comparison, the receiver can decide whether to resynchronize the decryptor.

The systems and methods described by RFC 2405 and Mizikovsky et al. suffer at least from the deficiency that some type of synchronization information or signature is appended to each encrypted message, which decreases the rate of transmission of encrypted data. Further, in performing encryption/ decryption and resynchronization, current cryptographic systems and methods are adapted to particular communications protocols and packet formats/sizes and are not generally applicable to different protocols.

SUMMARY

The disclosed technology provides systems and methods of securely communicating data. An encryptor located at a transmitter can provide encrypted data to the transmitter. The transmitter can maintain a packet number indicating a particular packet for carrying the encrypted data and a sub-packet number indicating a position within the packet where the encrypted data is to be stored. The encryptor can produce the encrypted data using an encryptor seed generated based on the packet number and sub-packet number. A receiver can maintain a receiver packet number indicating a number of previously received packets and can compute a receiver sub-packet number. The receiver can receive a packet containing encrypted data and can decrypt the encrypted data using a decryptor seed generated based on the receiver packet number and sub-packet number.

In one embodiment, a method of securely communicating data can include maintaining a packet number associated with a packet, encrypting a portion of unencrypted data based on the packet number so as to produce encrypted data, storing the encrypted data in the packet and transmitting, in a main communication channel, the packet to a receiver, and updating the packet number to reflect a next available packet number. The method can include successively encrypting, storing, transmitting and updating to communicate the encrypted data to the receiver. The method can also include transmitting, in a communication channel other than the main communication channel, at least one packet number and the encrypted data corresponding with that one packet number.

In one aspect, the method can include maintaining a sub-packet number that can be indicative of a location within the packet, wherein encrypting the unencrypted data can be based further on the sub-packet number, storing can include storing the encrypted data in the packet at the location indicated by the sub-packet number, and updating can include updating the sub-packet number to produce an updated sub-packet number. Additionally, the location indicated by the sub-packet number can correspond to a next available storage position in the packet.

In one aspect, the method can include generating an encryptor seed based on the packet number and the sub-packet number. The method can include producing further encrypted data based on said updated packet number and said updated sub-packet number. In addition, the method can include storing at least a portion of the further encrypted data in the packet.

In one aspect, the packet can correspond to one of a number of types of packets, including an Asynchronous Transfer Mode (ATM) cell, an ethernet packet, an Internet Protocol (IP) packet, a Multiprotocol Label Switching (MPLS) packet, an Optical Transport Network (OTN) frame, a Synchronous Optical Network (SONET) frame, or a SONET superframe. Encrypting the unencrypted data can include encrypting the unencrypted data one group of bits at a time, or one bit at a time. The updated packet number can be the same as the packet number, or greater than the packet number.

In one embodiment, a method of securely communicating data can include receiving a packet containing first encrypted data, determining a current packet number based on a previous packet number for a previous packet of encrypted data, and associatively storing at least a portion of the first encrypted data of said packet and the current packet number in a database including stored portions of data and associated packet numbers. The method can include receiving a second packet containing second encrypted data and a second packet number, searching the database to obtain a match between the second encrypted data and one of the stored portions of data, adjusting the current packet number based on a relation between the second packet number and the packet number associated with the stored portion matched, so as to obtain an adjusted packet number, and returning to receiving using the adjusted packet number as the previous packet number when additional data is communicated. In one aspect, the method can include decrypting a portion of the first encrypted data based on the first packet number and the updated sub-packet number, where the updated sub-packet number can be greater than the sub-packet number.

In one embodiment, a method of securely communicating data can include maintaining a pseudo-packet number and a sub-packet number, encrypting unencrypted data based on the pseudo-packet number and the sub-packet number to produce encrypted data, updating the pseudo-packet number the said sub-packet number to produce an updated pseudo-packet number and an updated sub-packet number, and communicating the encrypted data in a bit-stream, where the pseudo-packet number corresponds to a portion of the bit-stream containing the encrypted data, and where the sub-packet number indicates a location of the encrypted data in the portion of the bit-stream.

In one aspect, the method can include generating an encryptor seed based on the pseudo-packet number and the sub-packet number. The updated pseudo-packet number can be the same or greater that the pseudo-packet number. The method can also include producing further encrypted data based on the pseudo-packet number and the updated sub-packet number, where the updated sub-packet number is greater than the sub-packet number, and communicating the further encrypted data in the bit-stream.

In one embodiment, a method of securely communicating data can include receiving bytes of encrypted data in a bit-stream, determining a current pseudo-packet number based on a previous pseudo-packet number for previously received encrypted data, storing the encrypted data as a pseudo-packet and storing the current pseudo-packet number associatively with the pseudo-packet in a database including stored pseudo-packets and associated pseudo-packet numbers. The method can further include receiving a transmission containing second encrypted data and a second pseudo-packet number, searching the database to obtain a match between the second encrypted data and a portion of one of the stored pseudo-packets, adjusting the current pseudo-packet number based on a relation between the second pseudo-packet number and the pseudo-packet number associated with the one matched pseudo-packet to obtain an adjusted pseudo-packet number, and returning to receiving using the adjusted pseudo-packet number as the previous pseudo-packet number when additional data is communicated.

In one aspect, adjusting can include determining an offset of the portion from a beginning of the one pseudo-packet, comparing the offset to a byte adjustment value for incrementing the current pseudo-packet number, and when the offset is not equal to the byte adjustment value, discarding a number of bytes of the encrypted data and setting the byte adjustment value to equal the offset. The number of bytes discarded can be equal to the offset when the offset is less than the byte adjustment value, and can be equal to the offset less the byte adjustment value when the offset is greater than the byte adjustment value.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed systems and methods provide cryptography technology using seed values that are maintained at an encryptor and a decryptor. The encryptor produces encrypted data using an encryptor seed value that is generated using transmit-side values that are maintained at a transmitter. Similarly, the decryptor decrypts received data using receive-side values that are maintained at a receiver. The transmitter periodically communicates a transmit-side label to a receiver, which uses the transmit-side label to determine whether its receive-side values are correct. If the receive-side values are not correct, the receiver can adjust its receive-side values according to the magnitude of the error.

Figure 1:
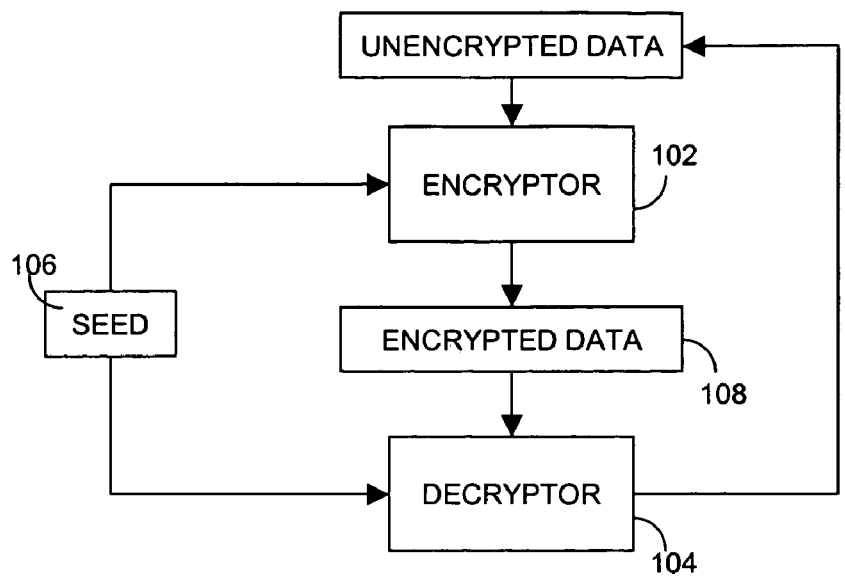
FIG. 1 is a diagram of a cryptographic system for encrypting and decrypting data based on a seed value.
Figure 2:
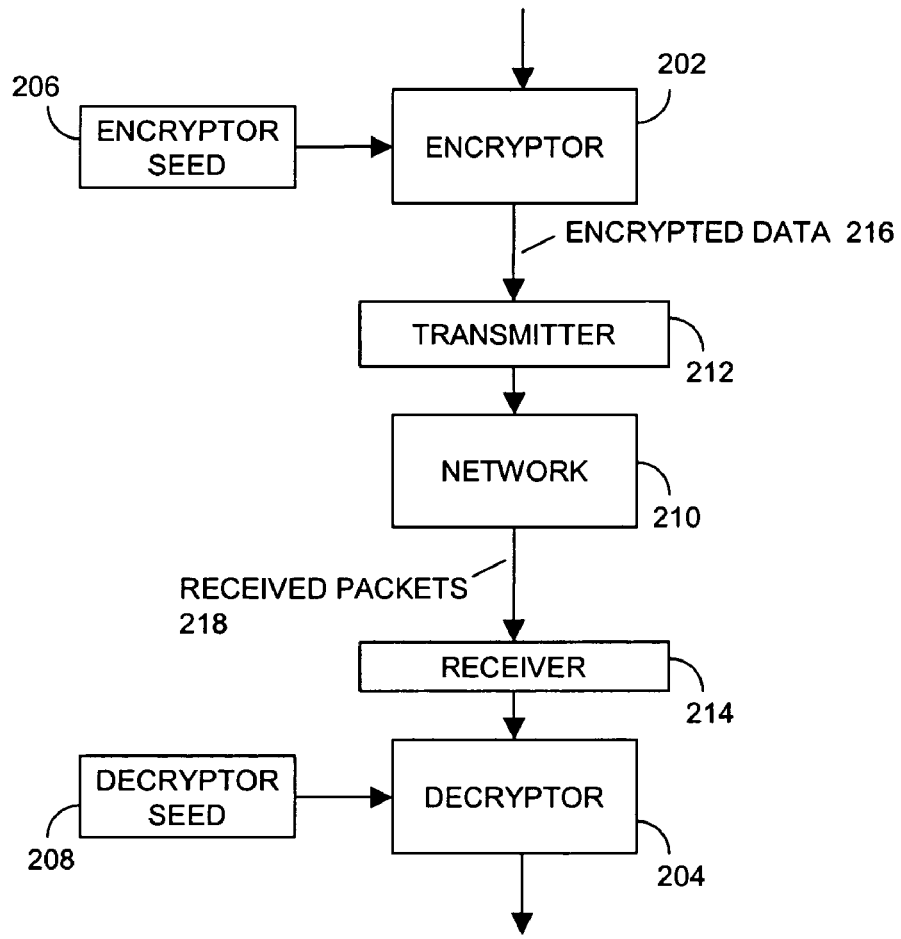
FIG. 2 is a diagram of a cryptographic system having seed values that are independently generated at the encryptor and decryptor.
Figure 3:
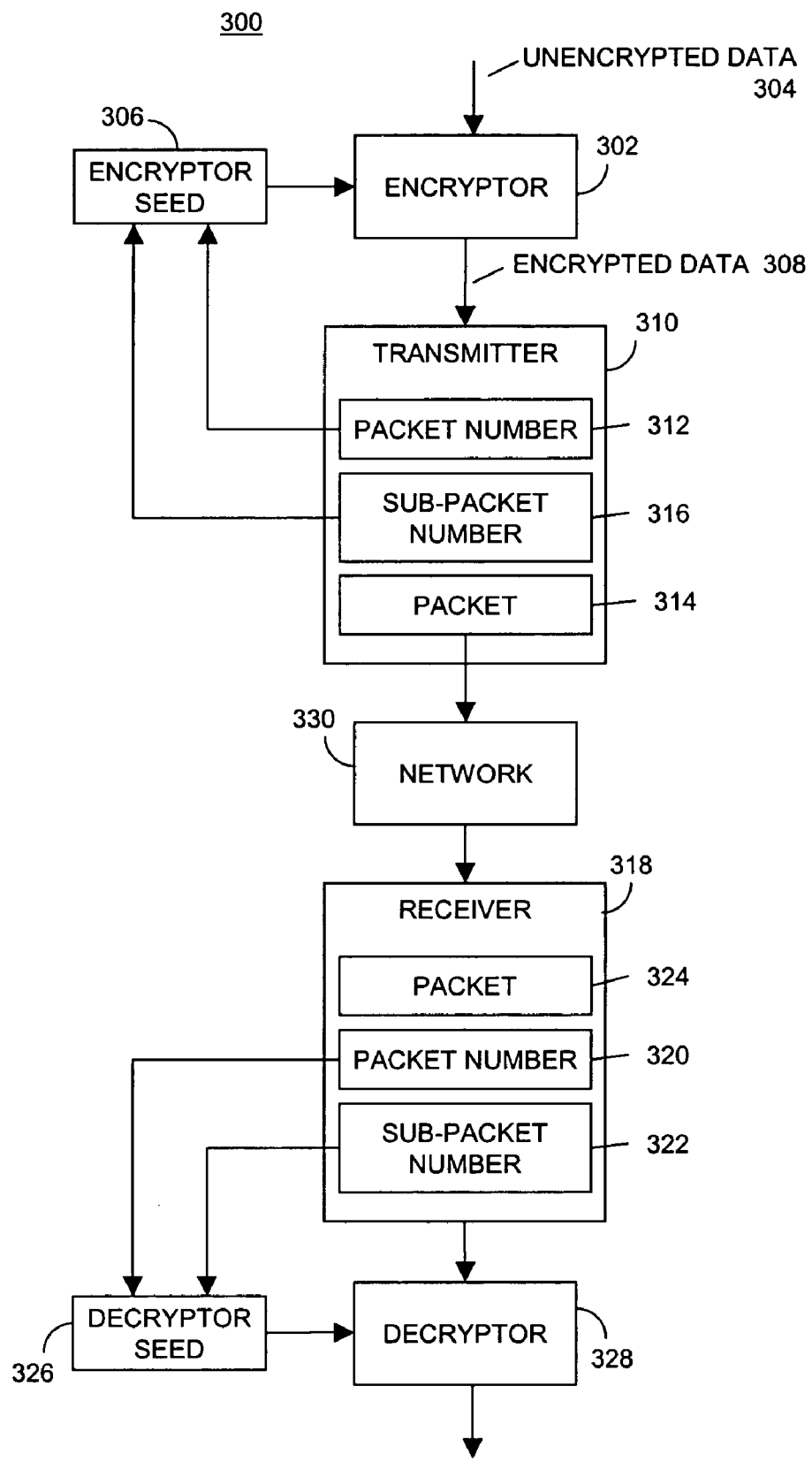
FIG. 3 is a diagram of a cryptographic system where seed values are generated based on a packet number and a sub-packet number.

Referring to FIG. 3, there is shown a system 300 for encrypting and decrypting data communicated over a network. An encryptor 302 receives unencrypted data 304 and can encrypt the unencrypted data based on an encryptor seed value 306 to produce encrypted data 308. Although the encryptor 302 in the illustrated embodiment is shown to receive and encrypt unencrypted data 304, the encryptor 302 can also receive and encrypt data that had been previously encrypted. The encryptor 302 can be a stream-cipher, which encrypts the unencrypted data one bit at a time, or a block-cipher, which encrypts the unencrypted data one group at a time. The encrypted data 308 can have the same length (e.g., the same number of bits) as the unencrypted data 304 or can have a different length, depending on the particular encryption method that is used.

The encrypted data 308 is provided to a transmitter 310 to be transmitted. The transmitter can operate based on one or more communications protocols, such as, but not limited to, Asynchronous Transfer Mode (ATM), Synchronous Optical Network (SONET), Internet Protocol (IP), and Optical Transport Network (OTN). As used herein, a "packet" refers to a grouping of bits having control information coupled to non-control data, and can correspond to an ATM cell, an OTN frame, a SONET frame/super-frame, a Multiprotocol Label Switching (MPLS) packet, and an IP packet, among others. The transmitter can maintain packet numbers that correspond to individual transmitted packets, where the current packet number 312 maintained at the transmitter 310 corresponds to the next packet 314 to be transmitted. The next packet 314 may be empty or partially filled, and thus, encrypted data 308 may be placed into the packet 314 at the beginning of the packet payload or at another position within the packet. The transmitter 310 can monitor this position by maintaining a sub-packet number 316 which can be, for example, the next available bit location in the packet 314 or the number of existing groups of bits currently in the packet. Thus, by maintaining a packet number 312 and a sub-packet number 316, a transmitter 310 can possess fore-knowledge about the particular packet 314 and the particular position within the packet 314 where encrypted data 308 is to be placed.

A packet number 312 and sub-packet number 316 can be maintained at a transmitter 310. At a receiver 318, a receiver packet number 320 can also be maintained while a sub-packet number 322 can be analytically derived. For example, suppose that the encryptor 302 produces fifty bytes of encrypted data 308 at a time and that a packet 314 can contain one-hundred fifty total bytes of encrypted data. At the transmitter 310, every time a fifty-byte block of encrypted data 308 is placed into a packet 314, the sub-packet number 316 can be increased by fifty. Then, whenever the sub-packet number 316 equals one-hundred fifty, the packet number 312 can be increased by one and the sub-packet number 316 can be reset to zero. At the receiver 318, a received packet 324 can be associated with the receiver packet number 320. Further, the three fifty-byte blocks of encrypted data within the received packet 324 can be associated with sub-packet numbers of fifty, one-hundred, and one-hundred fifty, respectively. In a different embodiment, a sub-packet number can be generated by a linear feedback shift register, as described in RFC 3686 by R. Housley. Thus, the packet number and sub-packet number in general can be maintained at both the transmitter 310 and receiver 318. Maintaining transmitter and receiver packet numbers and sub-packet numbers will be discussed in more detail with respect to FIGS. 5 and 10A-10B.

With further reference to FIG. 3, the transmitter packet number 312 and sub-packet number 316 can be used to generate the encryptor seed 306 that is used by the encryptor 302 to produce the encrypted data 308. Correspondingly, the receiver packet number 320 and sub-packet number 322 can be used to generate the decryptor seed 326 that is used by decryptor 328. In one example, a packet number 312 can form the most-significant bits (MSB) of a seed value 306 while a sub-packet number 316 can form the least-significant bits (LSB) of the seed value 306. The generating of seed values is not limited to this example, however, and other formulas and/or algorithms based on packet number and sub-packet number are also contemplated.

The components illustrated in FIG. 3 are exemplary and, unless otherwise specified, can be separated, rearranged, combined, and/or otherwise modified. For example, the encryptor seed may be generated from within the encryptor, which can receive a packet number and a sub-packet number from the transmitter. The encryptor, in turn, can be located within the transmitter, where the transmitter can receive unencrypted data and can produce packets containing encrypted data. Similarly, the decryptor seed can be generated from within the decryptor, which can be a component of the receiver. The packet number and sub-packet number can be maintained in a number of ways and is not limited to the exemplary embodiments provided herein. The encryptor seed and the decryptor seed can be generated using formulas, algorithms, and/or other methods and also are not limited to the exemplary embodiments provided herein. The transmitter 310, receiver 318, and network 330 can operate with one or more communications medium (e.g., copper twisted pair, coaxial cable, optical fiber, etc.) and can utilize line-based technologies (e.g., ethernet, DSL, cable modem, SONET, etc.) and/or wireless technologies (e.g., 802.11B, GSM, Bluetooth, etc.). The transmitter, receiver, and network can also operate based on a variety of communications protocols, such as ATM, SONET, TCP, and/or IP, among others. The communications protocols can provide for communicating data in packets or as a bit-stream. To provide clarity of illustration, the transmitter 310 and receiver 318 are shown to be separate from the network 330. However, the transmitter and receiver can be regarded as being components within the network. The network can comprise one or more components (e.g., cables, hubs, routers, cellular base-stations, etc.) that can be arranged in a variety of connections and topographies, including a single cable directly connecting the transmitter to the receiver, or a complex interconnection of remotely-located communications devices.

Referring now to FIGS. 4A-4D, there is shown a number of packet arrangements for carrying encrypted data. A packet is formatted according to a particular communications protocol and generally includes a control information portion 402 coupled to a non-control "data." Depending on the communications protocol used, a packet can carry a fixed amount of data or can carry a variable amount of data. For ease of explanation, it is assumed that packets referred to herein contain a fixed amount (e.g., fixed number of bytes) of data.

Figure 4A:
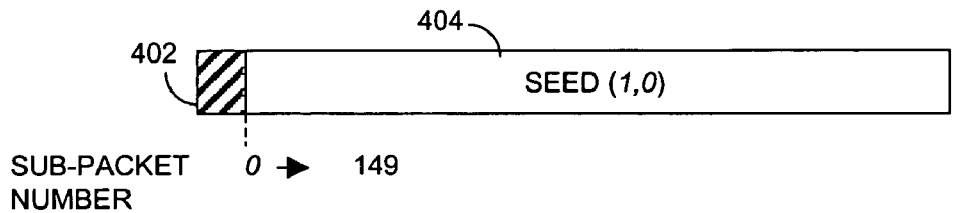
FIGS. 4A-4D are diagrams of packets containing data encrypted based on one or more seed values.

As previously provided herein, an encryptor 302 according to FIG. 3 uses an encryptor seed 306 that is generated based on a transmitter packet number 312 and a sub-packet number 316. In the illustrated example of FIGS. 4A-4D, the packet number can be initialized to "one" such that the first packet communicated by the transmitter can correspond to a packet number of "one". Subsequently, packets that are communicated can correspond to packet numbers of "two", "three", "four", etc. The sub-packet numbers in the illustrated example correspond to a byte-position within a particular packet where encrypted data can be stored. In the illustrated example, a sub-packet number of "zero" corresponds to the first available position in a packet. Accordingly, shown in FIG. 4A is a packet containing one-hundred fifty bytes of data 404 that was encrypted using an encryptor seed value that was generated using packet number="one" and sub-packet number="zero". An encryptor seed value is denoted herein as SEED (packet number, sub-packet number) and is thus SEED (1,0). The encrypted data 404 is stored in the packet beginning at position zero, corresponding to a sub-packet number of zero. The packet can contain a maximum of one-hundred fifty bytes of data, so there is no remaining space in the packet.

Figure 4B:
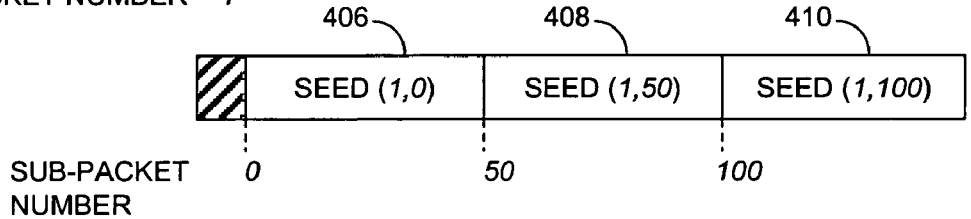

In an embodiment shown in FIG. 4B, an encryptor can produce fifty bytes of encrypted data for each encryptor seed. The first fifty bytes of encrypted data 406 are produced using encryptor seed value SEED (1,0) and are stored in the packet. The packet can contain a maximum of one-hundred fifty bytes and thus has available space to carry more data. Accordingly, the packet number remains the same while the sub-packet number is updated to be "fifty." The next encryptor seed is thus SEED (1,50) and is used to produce the next fifty bytes of encrypted data 408. After the second fifty bytes of encrypted data are stored in the packet, the sub-packet number is updated to be "one-hundred." Then, the last fifty bytes of data 410 are encrypted based on SEED (1,100) and are stored in the remaining space of the packet.

Figure 4C:
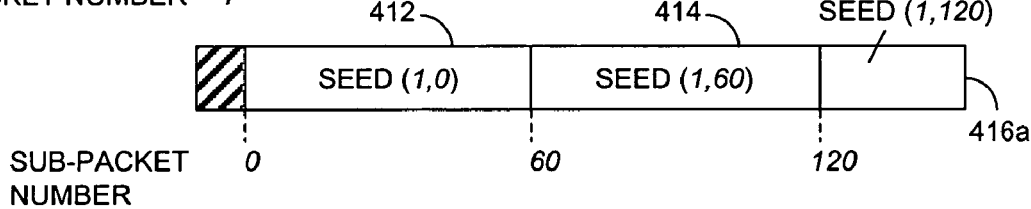
Figure 4C:
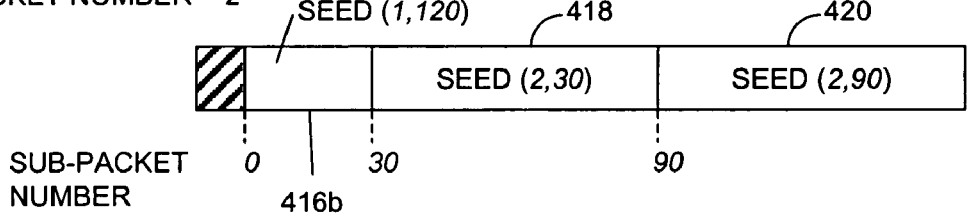

Although the three fifty-byte blocks of encrypted data in FIG. 4B were stored into a single packet, the packet space for holding data may not always be a multiple of the amount of encrypted data per encryptor seed. For example, as shown in FIG. 4C, an encryptor can produce sixty bytes of encrypted data for each encryptor seed. The first and second sixty-byte groups of encrypted data 412, 414 can be stored in packet number "one", but the third sixty-byte group 416a, 416b must be partitioned to be partially stored in packet number "one" 416a and partially stored in the next packet, packet number "two" 416b. Even so, the entire sixty-byte group of encrypted data 416a, 416b is encrypted based on the same seed value SEED (1,120). As shown in the figure, the next two sixty-byte groups 418, 420 are encrypted using seed values SEED (2,30) and SEED (2,90), respectively, and both are able to be completely stored in packet number "two."

Figure 4D:
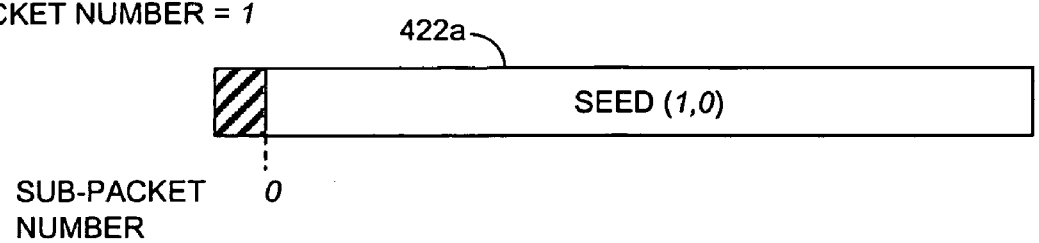
Figure 4D:
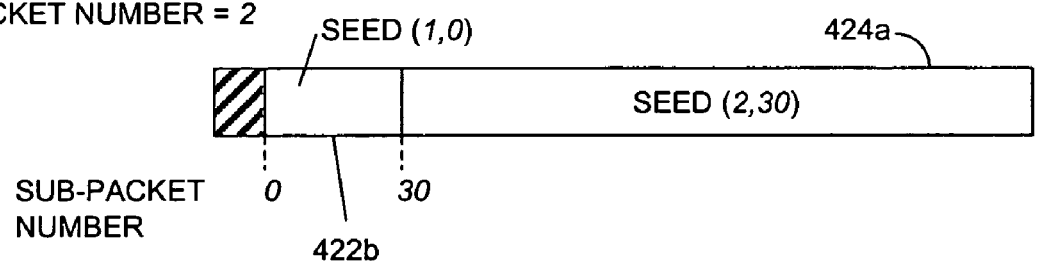

In one embodiment, an encryptor may produce a number of bytes of encrypted data per encryptor seed that is greater than the maximum space in a packet. Accordingly, as previously discussed, such encrypted data can be partitioned and stored into two or more separate packets. As shown in FIG. 4D, an encryptor can produce one-hundred eighty bytes of encrypted data 422a, 422b using seed value SEED(1,0). Thirty bytes of this data 422b is stored in packet number "two", which then has space to store one-hundred twenty bytes 424a of encrypted data produced from SEED (2,30), and so on.

The described packets, packet numbers, sub-packet numbers, and amount of encrypted data per seed value are exemplary and are not limited to the disclosed examples. Other values and embodiments are also contemplated. For example, a packet can contain a variable amount of data rather than a fixed amount of data, such that the length of a packet can be adjusted to prevent encrypted data from being partitioned across different packets. In one embodiment, the amount of encrypted data produced per seed value may not be fixed, and an encryptor can vary the amount of encrypted data produced for each seed value.

Figure 5:
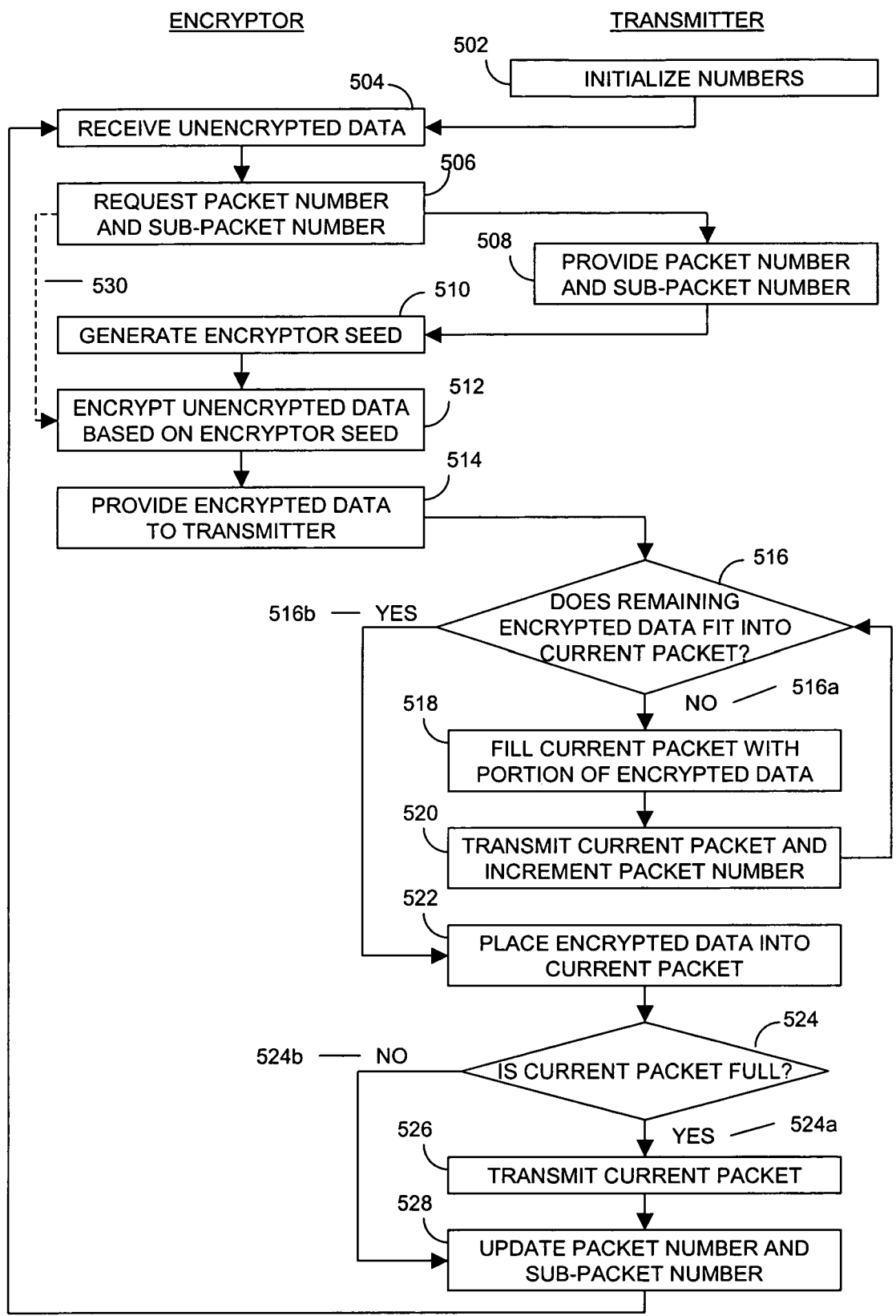
FIG. 5 is a flow chart of an exemplary method of encrypting data and transmitting encrypted data in one or more packets.

Referring now to FIG. 5, there is shown a flow chart 500 of an exemplary method for encrypting and transmitting data. The encryptor methodology is located on the left hand side of FIG. 5 and the transmitter methodology is located on the right hand side. In the exemplary method, the encryptor and transmitter are separate and are in communication with each other. Even so, as previously described, an encryptor can be a component within the transmitter in other embodiments. As shown in the FIG. 5 method 500, the transmitter initializes its packet number and the sub-packet number 502. In one embodiment, the packet number can be initialized to "one" to indicate that the current packet to be filled is the first packet, and the sub-packet number can be initialized to "zero." In another embodiment, a packet number of "zero" can correspond to the first packet, and a sub-packet number of "one" can correspond to the first position within a packet.

An encryptor can receive an arbitrary amount of unencrypted data to be encrypted 504. Depending on the encryptor configuration and/or the amount of data received, the encryptor can encrypt the unencrypted data as it is received, hold the data while waiting to receive more data, and/or partition the unencrypted data to be separately encrypted. When the encryptor is ready to begin encrypting data, it can provide a request to the transmitter for a packet number and a sub-packet number 506. In response, the transmitter can access the current values for those numbers and provide those values to the encryptor or to a encryptor seed generator 508, which can be separate from or part of the encryptor. The encryptor or the seed generator can then generate the encryptor seed 510 based on the received packet number and sub-packet number. The encryptor then uses the encryptor seed to encrypt the unencrypted data 512 and provides the resulting encrypted data to the transmitter 514.

In the embodiment of FIG. 5, the transmitter communicates encrypted data to a receiver in one or more packets. For the current packet, the transmitter can determine if the amount of encrypted data to be transmitted can fit into the packet 516. If the amount of encrypted data to be transmitted is greater than the remaining space in the current packet 516a, the transmitter can fill the remaining space with a portion of the encrypted data 518, transmit the filled packet, and increment the packet number by "one" 520 to designate a new, empty packet. The transmitter can then check if the remaining encrypted data fits into this new, empty packet 516. If the amount of encrypted data is less than or equal to the remaining space in the current packet 516b, the transmitter can place all of the encrypted data into the packet 522. If this results in the packet becoming full 524a (e.g., no remaining space), the transmitter can transmit the full packet 526, and then increment the packet number by "one" and reset the sub-packet number to "zero" 528. If the transmitter determines that the packet is not full 524b, then the packet number remains unchanged while the sub-packet number is updated to reflect the next available position in the packet for storing data 528. When all of the encrypted data has been placed in packets and/or transmitted, the encryptor can then receive more unencrypted data to be encrypted 504.

In one embodiment, an encryptor may not always provide a request for a packet number and a sub-packet number each time unencrypted data is received. For example, an encryptor may wish to use a particular seed value over several intervals of receiving unencrypted data 504. Accordingly, in such cases, the encryptor can refrain from providing a request to the transmitter and a new encryptor seed would not be generated. The encryptor can thus use an existing encryptor seed to produce encrypted data 530. The exemplary method of FIG. 5 can be used with a stream-cipher or with a block-cipher, and unencrypted data can be received by the encryptor one bit at a time, a fixed number of bits at a time, or a varying number of bits at a time.

Referring again to FIG. 3 and as previously discussed, the packets 314 communicated by the transmitter 310 may be lost during transmission, may arrive at the receiver out of order, and/or may be corrupted by noise and discarded by the receiver 318. When a receiver 318 discards a packet, it has knowledge of the action and can adjust the receiver packet number 320 and receiver sub-packet number 322 accordingly, thereby assuring that the decryptor 328 remains synchronized. However, when a packet 314 is lost during transmission or arrives at the receiver out of order, the receiver 318 does not always have knowledge of these conditions and, as a result, the decryptor 328 can become unsynchronized. To allow the receiver 318 to recognize when the decryptor 328 is unsynchronized, the transmitter 310 can periodically communicate a transmit-side label to a receiver. The receiver 318 can compare a transmit-side label to a corresponding receive-side label to determine whether the labels match. As discussed in more detail in FIGS. 11A and 11B, if the labels do not match, a receiver 318 can conclude that the decryptor 328 is unsynchronized and can attempt to resynchronize the decryptor 328.

Communicating transmit-side labels over the same channel as the encrypted data can be undesirable. The labels would add to the traffic existing on the channel, which may become overburdened and may result in loss of transmit-side labels and/or encrypted data packets. For example, a channel for carrying encrypted data can be an ATM channel, which can be allocated to satisfy an expected traffic profile. One particular ATM channel is a constant-bit-rate (CBR) channel. If encrypted data is communicated on the CBR channel at the allocated bit rate, the CBR channel cannot then carry the transmit-side labels without losing at least some of the labels and/or some amount of encrypted data.

Figure 6:
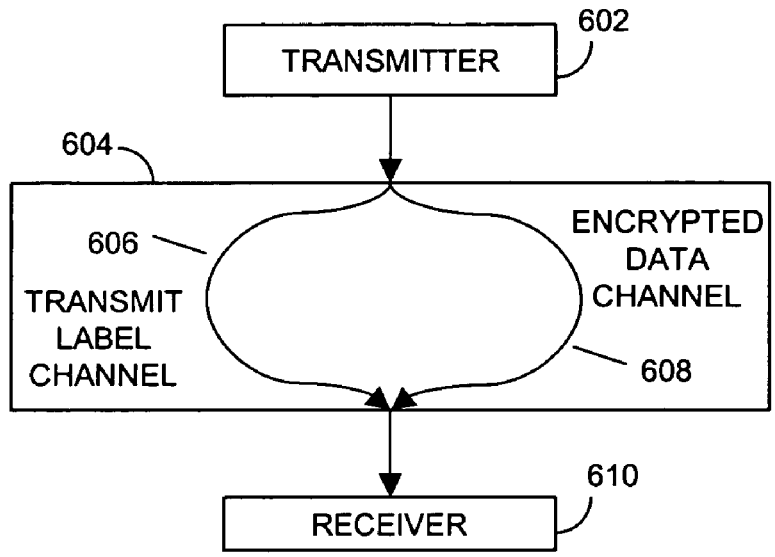
FIG. 6 is a diagram of a communication system having two channels for separately communication encrypted data and transmit-side labels.

As shown in FIG. 6, transmit-side labels can be communicated to a receiver 610 by way of a second channel 606 that is separate from the channel 608 carrying encrypted data. The transmit-side label channel 606 can be allocated separately from the encrypted data channel 608, such that the two channels can have different characteristics and can correspond to different communications protocols. Referring again to the previous CBR channel example, a transmitter 602 can communicate encrypted data across the CBR channel 608 and can separately allocate an Internet Protocol (IP) channel 606 for communicating transmit-side labels. While a CBR channel commonly guarantees some degree of reliable information delivery, an IP channel generally cannot. Accordingly, the transmit-side labels communicated over the IP channel 606 may experience variable latency conditions and/or re-ordering, among other things. However, as discussed in more detail with respect to FIGS. 9A and 9B, the disclosed technology is able to accommodate such a channel for carrying transmit-side labels.

Figure 7:
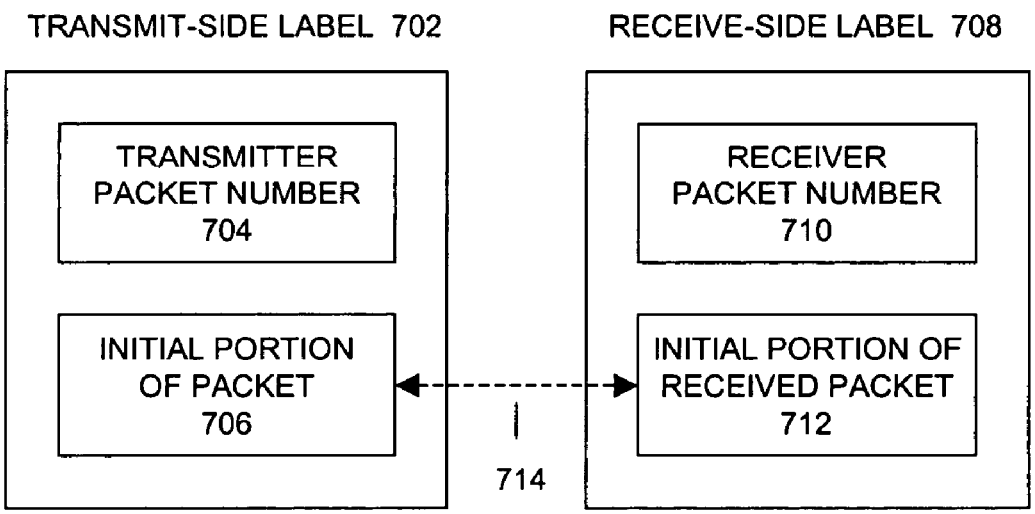
FIG. 7 is a diagram of a transmit-side label and a receive-side label.

Referring now to FIG. 7, a transmit-side label 702 can contain a transmitter packet number 704 and a group of encrypted data 706 that corresponds to the transmitter packet number. Periodically, a transmitter can form a transmit-side label 702 before transmitting a packet by including in the label 702 the packet number 704 of the packet and an initial portion of the encrypted data 706 contained in the packet. The amount of encrypted data 706 to include in the transmit-side label 702 can depend on, for example, the capacity of the transmit-side label channel and/or the probability of an initial portion of different encrypted data being the same. Also shown in FIG. 7 is a receive-side label 708 that can contain a receiver packet number 710 and a group of data 712 that corresponds to the receiver packet number. A receiver can form a receive-side label 708 for each packet that is received by including in the label 708 the value of the receiver packet number 710 at the time the packet was received and an initial portion of the encrypted data 712 contained in the received packet. The receiver forms a receive-side label 708 for each packet that is received because it has no knowledge about which packets have corresponding transmit-side labels. When a transmit-side label 702 arrives at a receiver, the receiver then searches the encrypted-data portions 712 of its receive-side labels 708 to find a match to the encrypted-data portion 706 in the transmit-side label 702. If the match 714 is found, the receiver compares the transmitter packet number 704 of the transmit-side label 702 to the receiver packet number 710 of the located receive-side label 708 to determine if they are the same. If the comparison concludes that the packet numbers 704, 710 are not the same, the receiver can attempt to adjust the receiver packet number maintained by the receiver according to the magnitude of the difference.

The transmit-side label 702 and receive-side label 708 shown in FIG. 7 can be implemented in a number of ways. For example, a transmit-side label can be a mere association between a packet number and an encrypted data portion, and the packet number and encrypted-data portion can be communicated to a receiver in a packet. Similarly, the receive-side label can also be a mere association between a receiver packet number and a received data portion.

Figure 8:
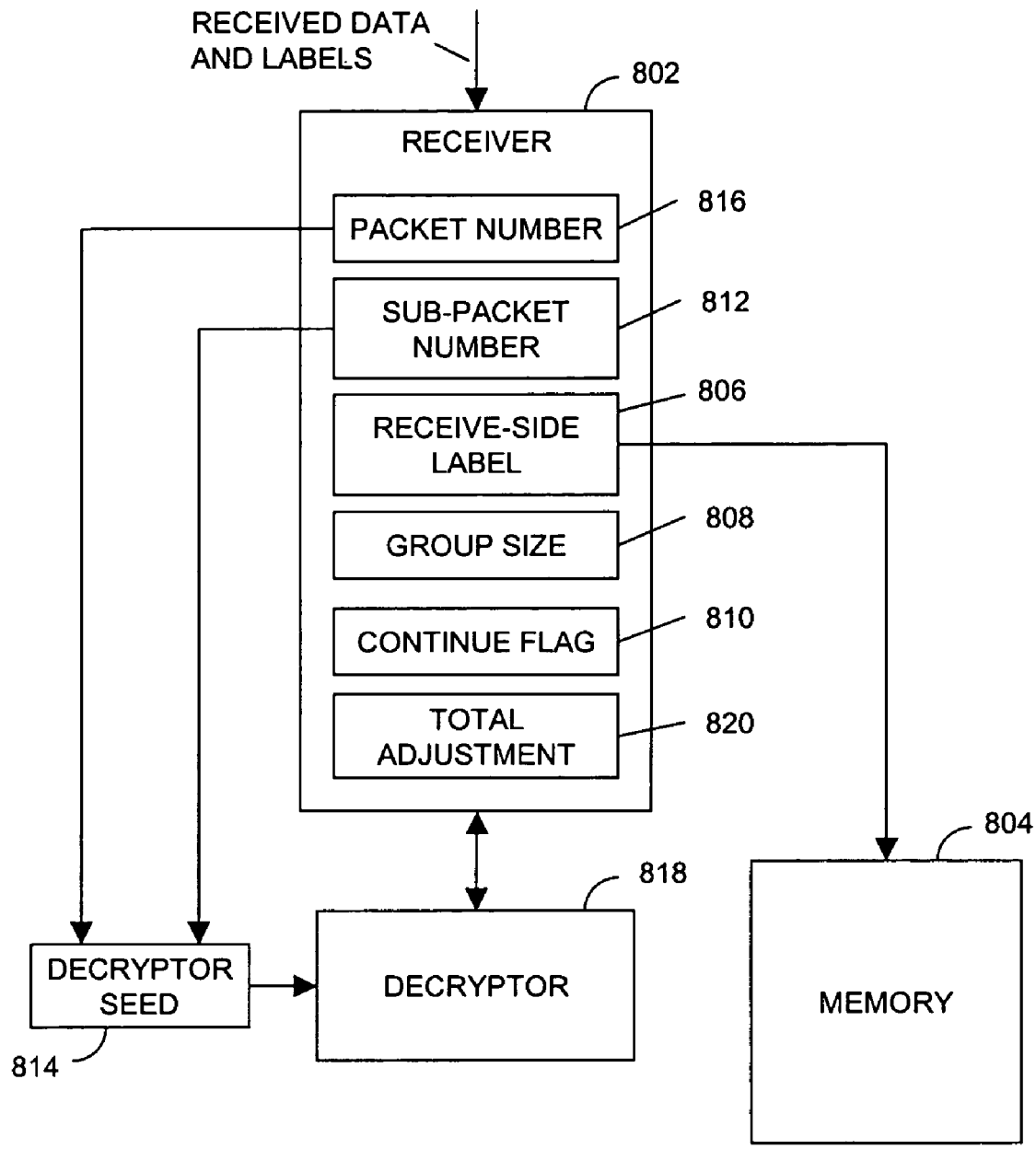
FIG. 8 is a diagram of a receiver component and a decryptor component.

As shown in FIG. 8, a receiver 802 can be in communication with a memory 804 for storing receive-side labels 806. The memory 804 can include one or more semiconductor-based memory chips in a variety of configurations, including SRAM chips and DRAM chips having 32-bit data widths or greater. Also, the memory 804 can have a write capacity that is greater than its read capacity, thereby allowing the receiver to store/write a receive-side label 806 for each packet that is received and to periodically read the memory 804 when a transmit-side label is received. The size (e.g., number of bytes/megabytes/gigabytes) of total memory 804 to provide can depend on the average or the maximum amount of time between receiving a packet and receiving its corresponding transmit-side label at the receiver 802, which in some cases can be approximately 20 milliseconds. Similarly, the read and write capacities to achieve for the memory 804 can depend on the rate at which encrypted data is received and processed by the receiver 802. As discussed later in more detail with respect to FIGS. 10A-10B, a receiver 802 can also maintain a group size value 808 a continuing flag value 810, and a total adjustment 820 value to produce the correct sub-packet number 812 and to generate the correct decryptor seed 814.

Figure 9A:
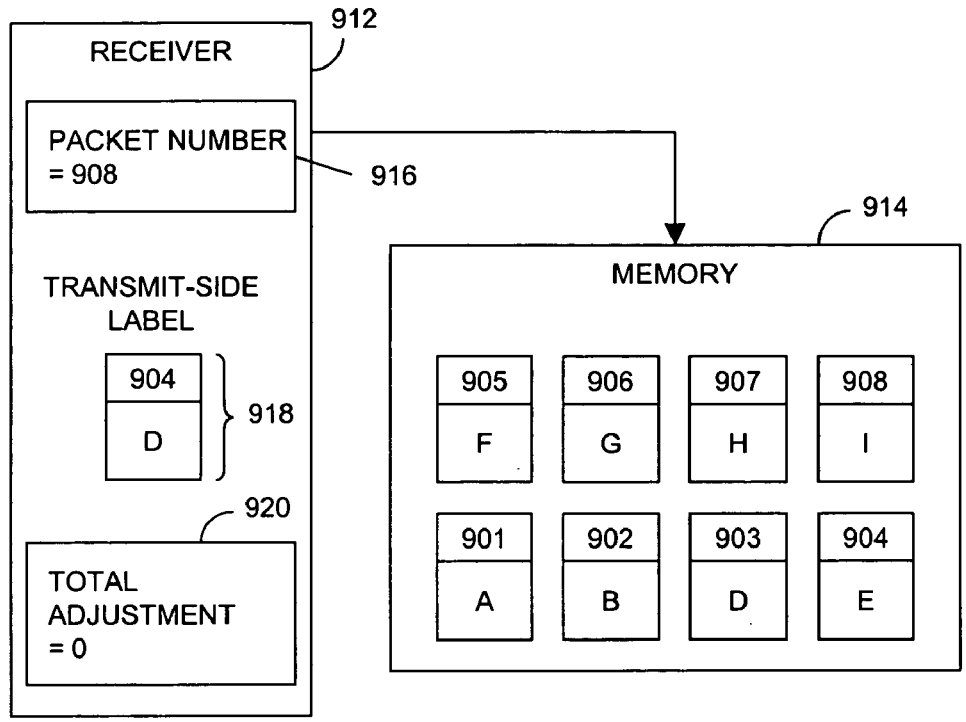
FIGS. 9A-9B are diagrams of adjusting a receiver packet number based on comparing a transmit-side label to a receive-side label.

Referring now to FIG. 9A, there is shown a receiver 912 that has received, in this example, nine-hundred and eight packets, with the receive-side labels 901-908 corresponding to the eight most recent packets stored in the memory 914. Before the next packet is received, the receiver packet number 916 maintained by the receiver 912 reflects the total number of packets received so far and, thus, is nine-hundred and eight. For clarity of illustration, the memory is shown to contain only eight receive-side labels 901-908, although in practice the number of stored receive-side labels would be much greater. Also, each receive-side label is shown to contain a single character as an initial portion of the corresponding received packet. This is also a simplification since the chance of a single character being the same for multiple labels is high, which would confuse the receiver 912 when it tries to locate a matching receive-side label for a transmit-side label 918. Accordingly, more characters and/or binary digits (bits) would be included in each receive-side label in most embodiments.

Figure 9B:
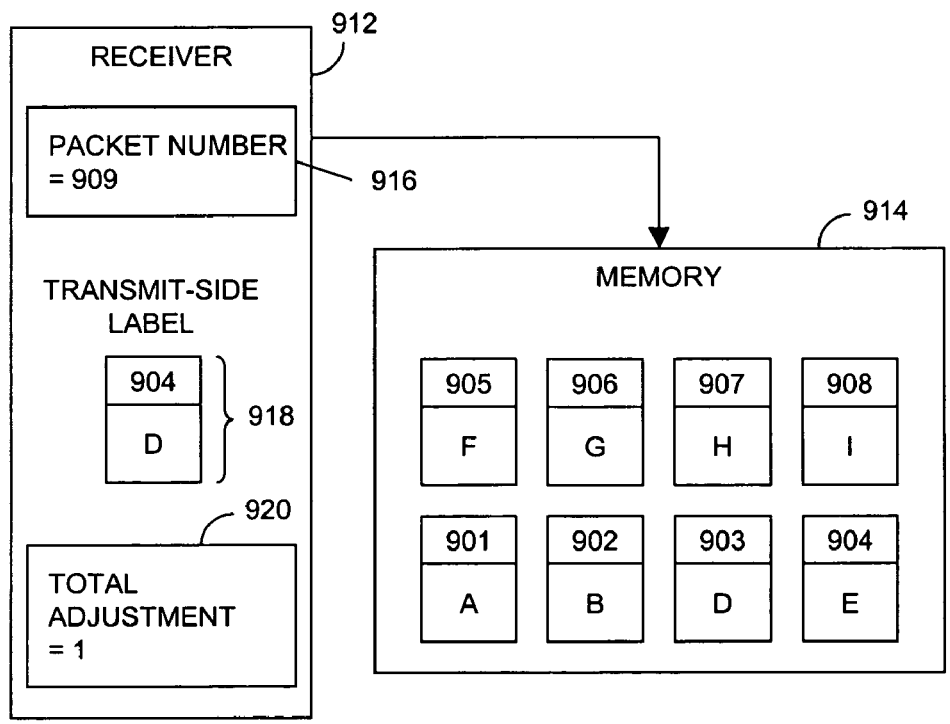

As shown in FIG. 9A, the receiver 912 is in possession of a transmit-side label 918 having a transmitter packet number of nine-hundred four and an encrypted data portion of "D". The receiver 912 can access the memory 914 to search for a receive-side label having the same encrypted data portion "D" and locates such a receive-side label 903. The located receive-side label 903 has a packet number of nine-hundred three, which the receiver recognizes is not the same as the transmitter packet number in the transmit-side label 918. Thus, based on the discrepancy, the receiver 912 can conclude that the value of its current receiver packet number 916 reflecting a value of nine-hundred and eight is incorrect and that the decryptor is unsynchronized. In one embodiment, the receiver can attempt to resynchronize the decryptor by adjusting its receiver packet number. The receiver can adjust the value of the receiver packet number 916 by the amount of the difference between the transmitter packet number in the transmit-side label 918 and the receiver packet number in the receive-side label 903, which in the illustrated example is a difference of "one." Accordingly, as shown in FIG. 9B, the value of the receiver packet number 916 is increased by "one" to nine-hundred and nine. In one embodiment, the receiver 912 can adjust the value of its receiver packet number 916 based on more than one transmit-side label. For example, referring again to FIG. 9A, the receiver 912 can adjust the value of the receiver packet number 916 after confirming, from receiving multiple transmit-side labels, that the value of the receiver packet number 916 is indeed incorrect.

It is possible that because there was a discrepancy between the transmit-side label 918 and its corresponding receive-side label 903, there will also be a discrepancy between receive-side labels 905-908 and their corresponding transmit-side labels, if any are received. If these subsequent discrepancies also have a packet number difference of "one," the receiver 912 need not adjust the value of the receiver packet number 916 again since it was already adjusted based on transmit-side label 918. To recognize this situation, the receiver can maintain a total adjustments number 920 that represents the largest discrepancy between a transmitter packet number and a receiver packet number that has been accounted for. As shown in FIGS. 9A and 9B, the value of total adjustments 920 was "zero" in FIG. 9A before any adjustment was made and "one" in FIG. 9B after the adjustment is made. Thus, if a subsequent transmit-side label corresponding to one of the receive-side labels 905-908 is received, another adjustment to the receiver packet number 916 should be made only if the subsequent difference in packet number is greater than the value of total adjustments 920.

The receive-side labels can be stored in the memory in a number of ways. In one embodiment, a receive-side label can be stored in a memory location/address using a hash function. Many types of hash functions are well-known and can be used here. For example, a hash function can take the encrypted-data portion of a receive-side label and produce a memory address that is unique to the particular encrypted-data portion. Accordingly, there can be a one-to-one association between possible encrypted-data portions and memory addresses. Thus, the receiver can store the receiver packet number in a memory location produced by the hash function without storing the encrypted-data portion itself, since the receiver packet number is intrinsically associated with the encrypted-data portion by being stored in the particular memory location. In the case where a hash function does not provide a one-to-one association between encrypted-data portions and memory addresses, the hash function can produce the same memory address for different encrypted-data portions, which is referred to as a "collision." The manners in which collisions are handled are well known and can be applied here. In one embodiment, when a transmit-side label received by the receiver corresponds to a memory address subject to collision, the incoming transmit-side label can be dropped. The dropping of the transmit-side label can result in a perceived need for an adjustment in the receiver to correct the supposed synchronization error that results from the dropped transmit-side label being missing from the hash table. However, by requiring multiple sequential labels to indicate the same receive count error, the potential adjustment can be made as improbable as desired.

Figure 10A:
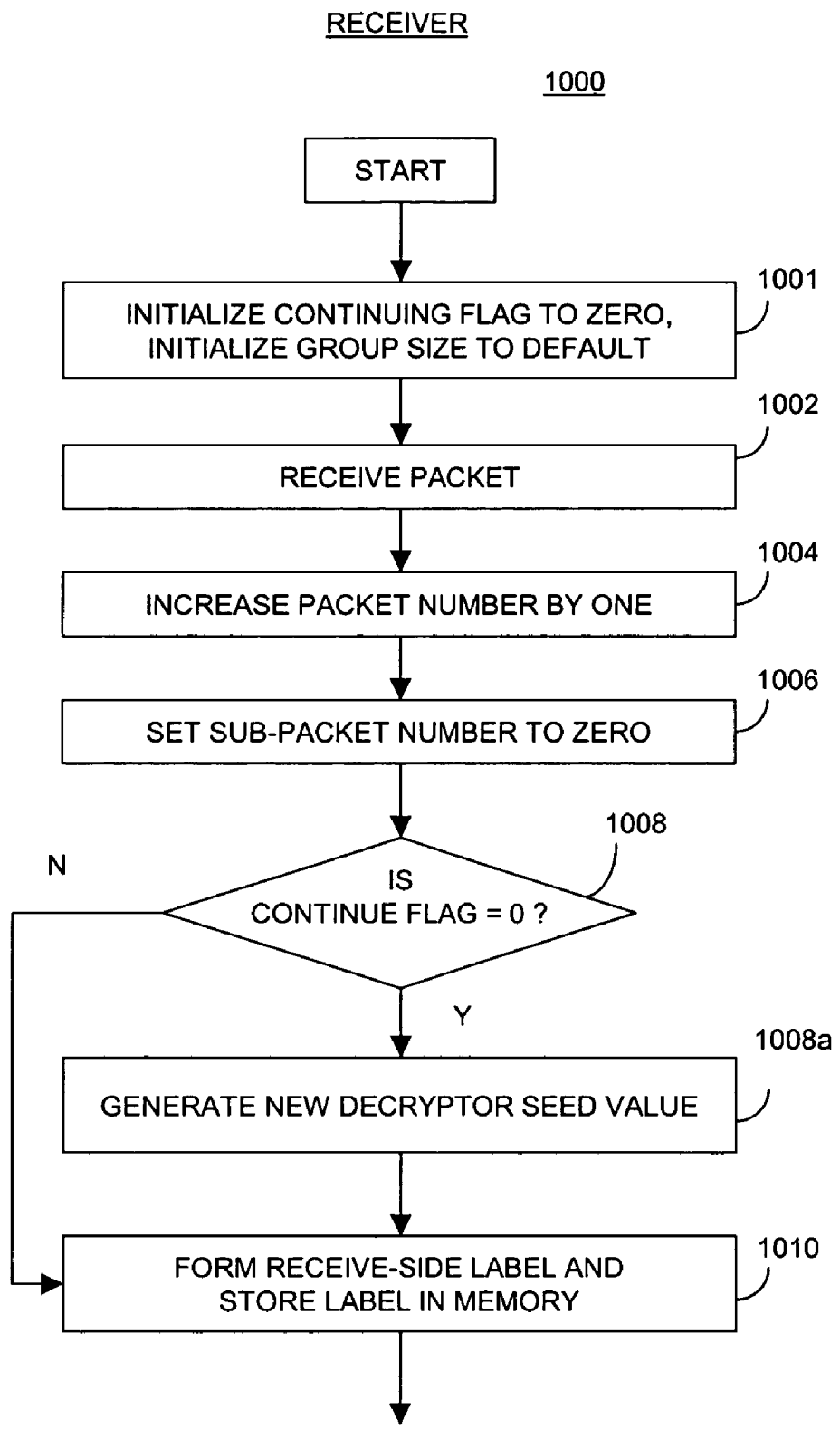
FIGS. 10A-10B are flow charts of an exemplary method of receiving encrypted data and maintaining receiver packet numbers and sub-packet numbers.
Figure 10B:
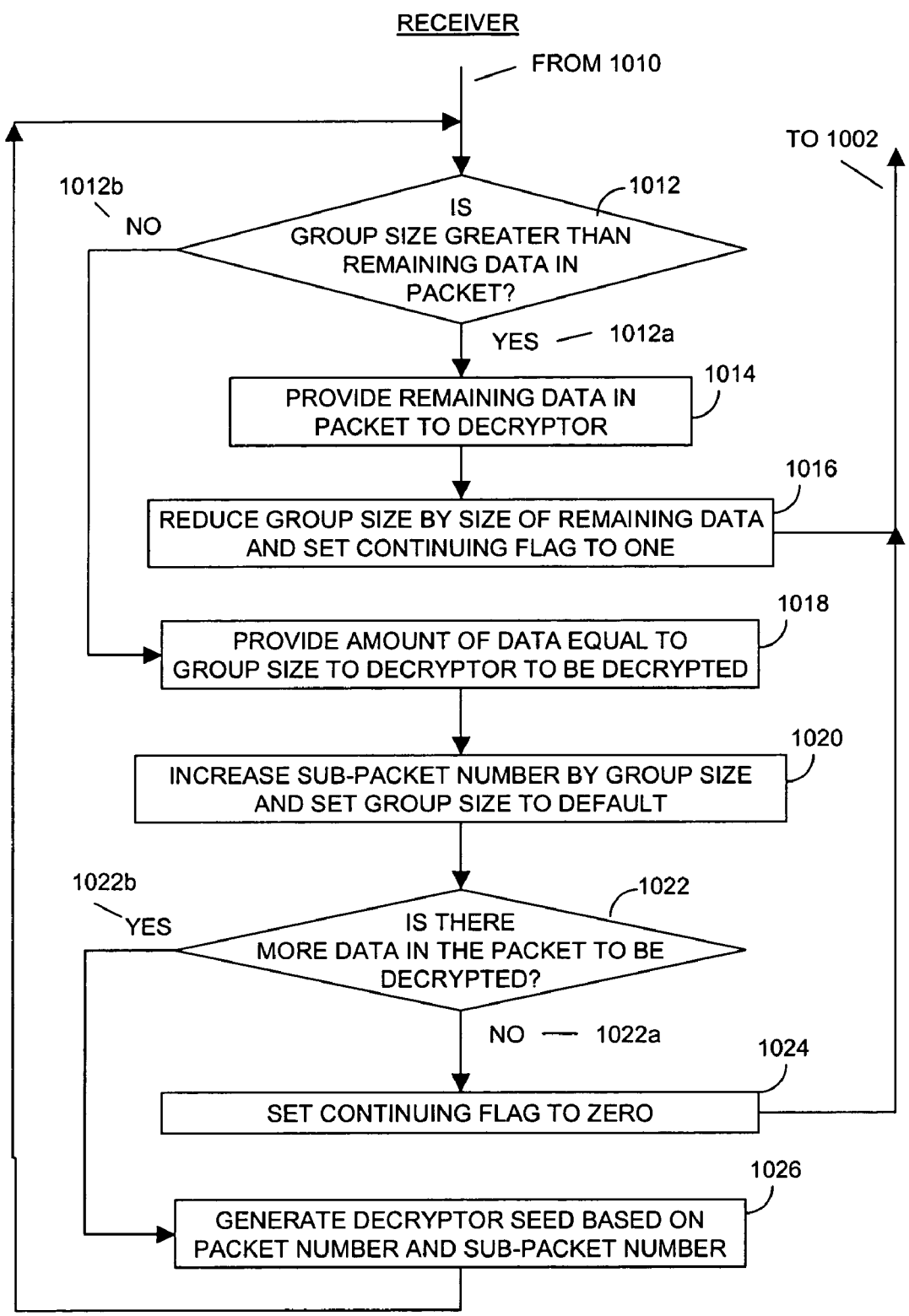

Referring now to FIGS. 10A and 10B, there is shown a flow chart 1000 of an exemplary method of receiving packets and of maintaining packet numbers and sub-packet numbers at a receiver. The receiver can be initialized by setting its continuing flag value to "zero" and its group size value to a default value 1001. The continuing flag and group size values are used by the receiver to derive the correct sub-packet number and will be described below. The receiver can receive packets from an encrypted data channel 1002. Upon receiving a packet, the receiver can increment the receiver packet number by "one" 1004 and set the sub-packet number to "zero" 1006. The receiver then checks the value of the continue flag 1008. The continue flag can assume one of two values and is a true/false indicator of whether the encrypted data beginning at location "zero" of the received packet was encrypted using the same seed value as data in the previous packet. If the continue flag equals "zero," it indicates that the encrypted data was encrypted using a new seed value, and the receiver generates a new decryptor seed value SEED (receiver packet number, 0) 1008a. If the continue flag equals "one," it indicates that the encrypted data was encrypted using the same decryptor seed as data from the previous packet, and the receiver does not generate a new seed value. Regardless of the value of the continue flag, the receiver forms a receive-side label containing the receiver packet number and an initial portion of the encrypted data in the received packet and stores the receive-side label in memory 1010.

With reference to FIG. 10B, the receiver maintains a group size value that indicates the amount of encrypted data, still to be retrieved from one or more packet(s), that was encrypted using the current seed value. The receiver can compare the group size value to the amount of encrypted data (remaining) in the packet 1012. If the group size is greater than the amount of encrypted data 1012a, the receiver provides the entirety of the data to the decryptor 1014, reduces the group size value by the amount provided to the decryptor, and sets the continuing flag value to "one" 1016. The receiver then waits to receive another packet 1002. Thus, when the next packet arrives 1002, the receiver will recognize that an amount of data equal to the group size value was encrypted using the same seed value as the previous packet's data. If the group size value is less than or equal to the amount of encrypted data in the packet 1012b, the receiver can provide an amount of data equal to the group size value to the decryptor 1018. The receiver can update the sub-packet number by increasing it by the group size value and can then set the group size to a default value 1020. As previously discussed, this "default value" indicates the amount of encrypted data to retrieve for the next decryptor seed value. The default value can be a fixed value, or it can be variable and can be computed by the receiver.

The packet could now be in one of two possible situations. The packet may be empty 1022a, or the packet may still contain encrypted data to be decrypted 1022b. The receiver makes this determination 1022, and if the packet is empty 1022a, the receiver sets the continuing flag to "zero" 1024 and waits to receive the next packet 1002. When the next packet is received 1002, the receiver will recognize that continuing flag is "zero" and will generate a new decryptor seed 1008. If the receiver determines that there is still data in the packet to be decrypted 1022b, the receiver can generate a new decryptor seed 1026 for the remaining data based on the receiver packet number, which has not changed for the current packet, and the sub-packet number, which was previously updated 1020. Then, the receiver again compares the group size value to the amount of encrypted data remaining in the packet 1012, repeating the receiver method starting from that comparison.

As shown in the exemplary method of FIGS. 10A to 10B, a new decryptor seed is calculated in two situations. In the first situation, the receiver receives a new packet and recognizes that the continue flag is "zero" 1008, which indicates that the encrypted data in the new packet was encrypted using a different seed value than the encrypted data in the previous packet. In this situation, the receiver packet number and sub-packet number were just updated 1004, 1006, and the new calculated decryptor value is SEED (receiver packet number, 0). In the second situation, the receiver has just provided the decryptor with all of the encrypted data corresponding to the current seed value 1018 and there is remaining data in the current packet corresponding to a new seed value 1022b. In this situation, the receiver packet number remains unchanged and the sub-packet number was already updated to reflect the starting position of the remaining data 1020. Then, before the receiver provides the encrypted data to the decryptor, it calculates the new seed value 1026 based on the unchanged packet number and the updated sub-packet number. Based on this exemplary method, the different packet arrangements shown in FIGS. 4A through 4D can be properly received.

Figure 11A:
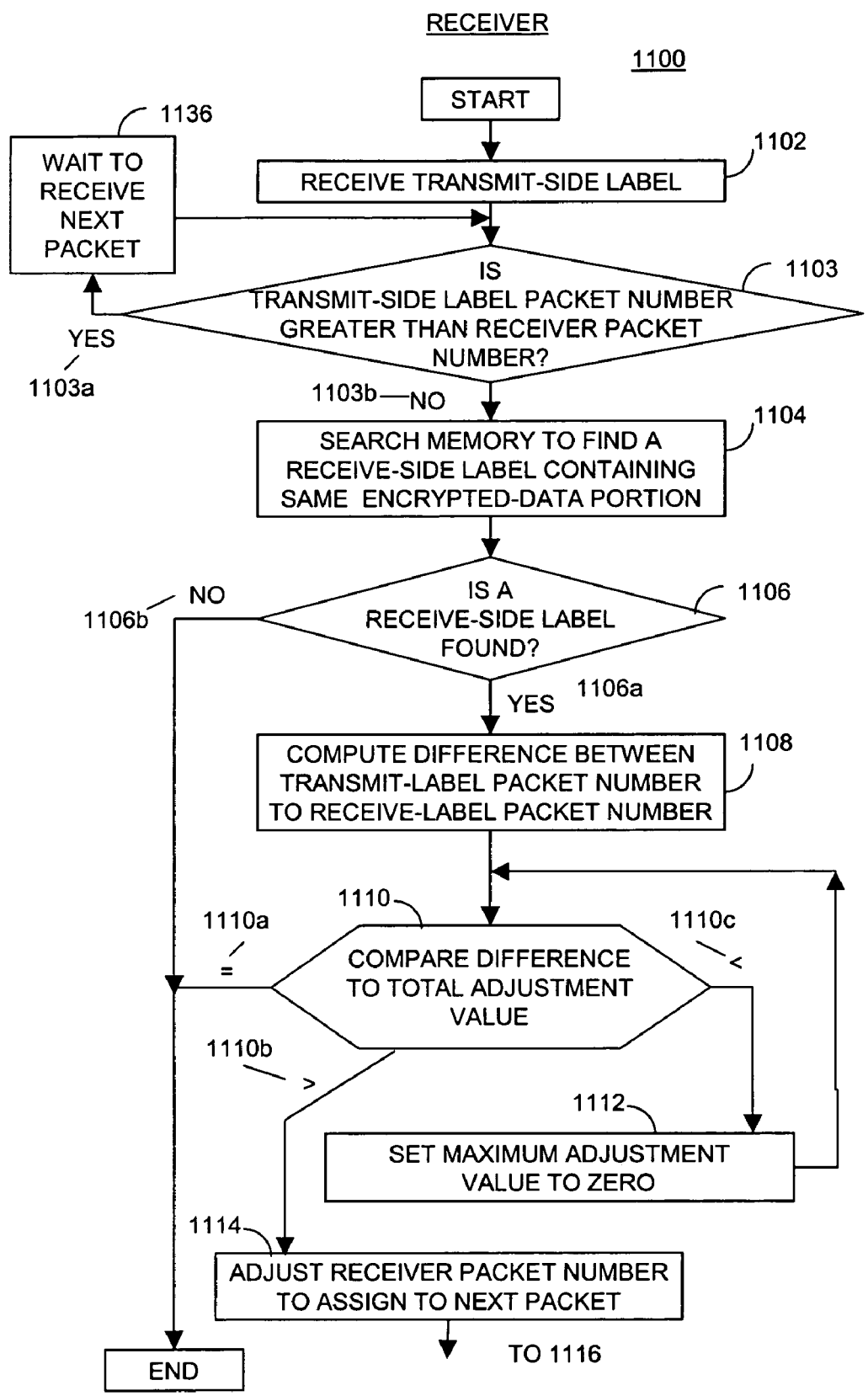
FIG. 11A-11B are flow charts of an exemplary method of receiving a transmit-side label and adjusting receiver parameters.

Referring now to FIG. 11A, there is shown a flow chart 1100 of an exemplary method of detecting whether a decryptor is unsynchronized. As previously discussed, a transmitter can periodically transmit a transmit-side label to allow a receiver to recognize when a decryptor is unsynchronized. A receiver can receive a transmit-side label 1102 having a transmitter packet number and an encrypted-data portion. The transmit-side label can arrive either before or after its corresponding packet is/was received by the receiver. In the illustrated embodiment, the receiver can determine whether the packet corresponding to a transmit-side label should have arrived by comparing the transmit-side label packet number with the receiver packet number 1103. If the transmit-side label packet number is greater than the receiver packet number 1103a, the receiver can wait to receive another packet 1136 and then make the comparison again. The receiver may not actually "wait," but rather can place the transmit-side label in a queue until the next packet is received. If the transmit-side label packet number is equal to or less than the receiver packet number 1103*b*, the receiver can access memory to search for a receive-side label containing the same encrypted-data portion as that in the transmit-side label 1104. If such a receive-side label is located 1106*a*, the receiver computes the difference between the transmitter packet number of the transmit-side label to the receiver packet number of the receive-side label 1108. The receiver can compare this difference to a total adjustment value maintained by the receiver 1110. As previously discussed with respect to FIGS. 9A and 9B, the total adjustment value represents the difference between the transmitter packet number and the corresponding receiver packet number that has already been accounted for. Accordingly, if the difference is equal to the total adjustment value 1110*a*, the difference has already been accounted for and the receiver need not make any adjustments to the receiver packet number, where this method of detecting if a decryptor is unsynchronized ends. If the difference is greater than the total adjustment value 1110*b*, the receiver has not yet accounted for all of the difference and can therefore adjust the current receiver packet number based on the difference 1114. In a third scenario, the difference can be less than the total adjustment value 1110*c*. In this 1110*c* scenario, the difference may be less than the total adjustment value because the receiver packet number from the receive-side label was a number that resulted from a previous adjustment by the receiver based on a previous transmit-side label, indicating that an attempt to resynchronize the decryptor occurred before the receive-side label was formed. In this case, the total adjustment value can be reset to "zero" 1112 and the difference can again be compared to the total adjustment value (now "zero") 1110.

It may be the case that an adjustment to the receiver packet number based on a single transmit-side label does not resynchronize the decryptor. However, subsequently received transmit-side labels can allow the receiver to make further adjustments that may resynchronize the decryptor. In the exemplary method, if a receiver cannot locate a receive-side label that corresponds to a received transmit-side label 1106*b*, or, as noted above, if a receive-side label is located but the difference between the transmitter packet number and the receiver packet number is equal to the total adjustment value 1110*a*, then no adjustment is made to the receiver packet number, and the method ends.

Figure 11B:
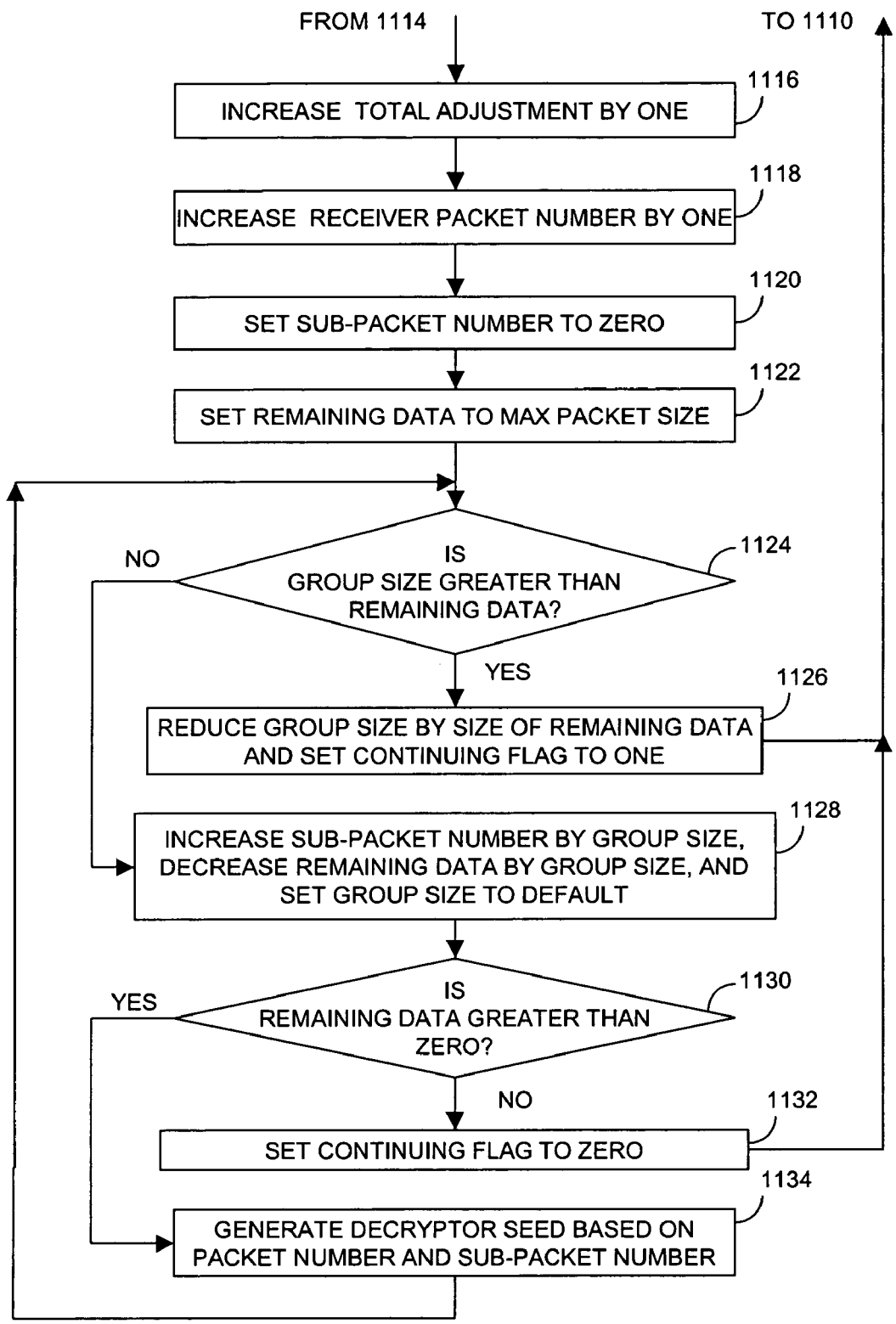

Shown in FIG. 11B is a flow chart of an exemplary method of adjusting the receiver packet number so that the receiver can also have the correct group size value and continue flag value. The flow chart of FIG. 11B continues from FIG. 11A and is analogous to FIGS. 10A and 10B in that each increase to the receiver packet number can be treated as if a new packet is received. However, since no new packet is actually received, the adjustment method maintains a "remaining data" value representative of the amount of data that would have been received in an actual packet. No encrypted data is provided to the decryptor, and the receiver does not form any receive-side labels. Also, the total adjustment value is increased by "one" 1116. For every increase in the total adjustment value by "one", the receiver packet number 1118 is increased. Other than these differences, the adjustment methodology of FIG. 11B is otherwise the same as FIGS. 10A and 10B. For example, the sub-packet number is set to zero 1120 and the remaining data is set to the maximum packet size 1122. If the group size is greater than the remaining data 1124, then the group size is reduced by the size of the remaining data and the continuing flag is set to "one" 1126 and the method returns to 1110. If not, the sub-packet number is increased by the group size, the remaining data is decreased by the group size, and the group size is set to the default 1128. If the remaining data is not greater than zero 1130, than the continuing flag is set to zero 1132 and the method returns to 1110. If the remaining data is greater than zero, a new decryptor seed is then generated based on the packet number and sub-packet number 1134 and the method returns to 1124.

The process by which the receiver can resynchronize the decryptor is not limited to the exemplary methods illustrated in FIGS. 11A and 11B. For example, a receiver need not use the exemplary method of FIG. 11B to maintain the correct receiver sub-packet value and group size value when adjusting the receiver packet number. In one embodiment, the size of each packet may be an unchanging value N, and the amount of encrypted data produced per seed value may be an unchanging value P. A receiver having such values can resynchronize the decryptor using mathematical formulas based on those values. For example, if the receiver packet number for the next received packet is (R+1), the receiver can compute the values:

$$A = \text{int}\left(\frac{P \cdot \text{int}\left(\frac{R \cdot N}{P}\right)}{N} + 1\right), \text{ and } B = \text{mod}\left(\frac{P \cdot \text{int}\left(\frac{R \cdot N}{P}\right)}{N}\right)$$

where int(x) returns the highest integer less than x, and mod (x/y) returns the integer remainder of (x/y). Using these formulas, A and B are the packet number and sub-packet number, respectively, to use for generating the decryptor seed for decrypting the encrypted data in the next packet (R+1). Further, the number of bits already retrieved for the generated decryptor seed is (N−B), and the number of bits still to be retrieved (e.g., group size value) from the next packet is (P−(N−B)). Thus, to resynchronize the decryptor, a receiver can set the receiver packet number to assign to the next packet to (R+1), compute the decryptor seed based on A and B, set the group size value to (P−(N−B)), and set the continue flag value to "one" if A<(R+1) or to "zero" if A=(R+1). Using the formula for A in the example, in no case will A be greater than (R+1).

As discussed with respect to the exemplary method of FIGS. 10A and 10B, a receiver can compute a decryptor seed based on its receiver packet number and sub-packet number at times when a new decryptor seed is needed. In this embodiment, the decryptor can receive encrypted data from the receiver and decipher the encrypted data based on the current decryptor seed. While the task of maintaining the decryptor seed can be handled by the receiver, the receiver and the decryptor may need to communicate to coordinate when a decryptor will read the decryptor seed and when the receiver can replace the current decryptor seed with a new value. The decryptor may decipher the encrypted data bit-by-bit, corresponding to a stream-cipher, or the decryptor may wait to receive a certain amount of encrypted data before decrypting the encrypted data as a group, corresponding to a block cipher.

What has been described thus far is a system and method of encrypting and decrypting data and communicating data in one or more packet(s). As previously mentioned and with reference again to FIG. 3, the transmitter, network, and receiver can operate based on one or more communications protocols. In one embodiment, the transmitter and receiver may communicate encrypted data as a stream of bits without using packets. The stream of bits can be preceded by signals designating the beginning of the stream and/or followed by signals designating the end of the stream. However, the stream itself contains only encrypted data and does not contain control information therein.

The disclosed technology can be applied to bit-streams in much the same way that it can be applied to packets. As previously described, a packet number can be associated with a packet containing a particular amount of encrypted data, and a sub-packet number can indicate the position in the packet where the encrypted data begins. Although the encrypted data in a bit-stream is not partitioned into packets, the same amount of encrypted data in a portion of a bit-stream, as would appear in a packet, can still be associated with a packet number. As used herein, a packet number applied to a group of encrypted data in a bit-stream is referred to as a "pseudo-packet number," and the corresponding group of encrypted data is referred to as a "pseudo-packet."

Figure 12A:
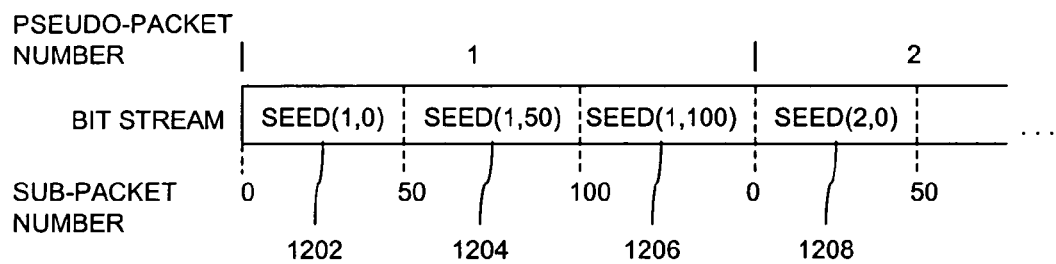
FIGS. 12A-12B are diagrams of bit-streams containing data encrypted based on one or more seed values.
Figure 12B:
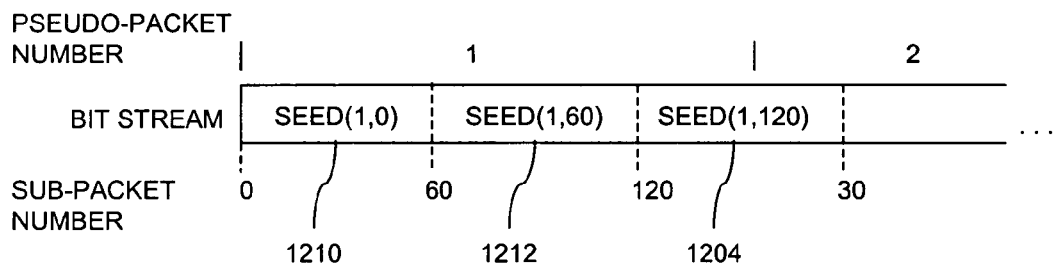

Shown in FIGS. 12A and 12B are bit-streams containing pseudo-packets of encrypted data. In one embodiment, a pseudo-packet can contain a fixed amount of encrypted data, and a sub-packet number can correspond to a beginning position in the pseudo-packet where the encrypted data is located. A transmitter can maintain the pseudo-packet number and the sub-packet number, and an encryptor seed value can be computed based on these numbers. Referring to FIG. 12A, there is shown a pseudo-packet number "one" containing one-hundred fifty bytes of encrypted data 1202-1206, and an initial portion of pseudo-packet number "two." As shown, each seed value can be used to produce fifty bytes of encrypted data. Accordingly, the initial three fifty-byte groups 1202-1206 are encrypted based on SEED (1,0), SEED (1,50), and SEED (1,100), respectively. The three groups of encrypted data 1202-1206 fit into one pseudo-packet, and in this example, no encrypted data is carried over into the next pseudo-packet. Thus, the next fifty-byte group of data 1208 is encrypted based on SEED (2,0), and so on. Referring now to FIG. 12B, each seed value in the illustrated embodiment can be used to produce sixty bytes of encrypted data. The initial three sixty-byte groups of encrypted data 1210-1214 are produced based on SEED (1,0), SEED (1,60), and SEED (1,120), respectively. In the group of encrypted data 1214 corresponding to SEED (1,120), thirty bytes are located in pseudo-packet number "one" and the other thirty bytes are located in pseudo-packet number "two." Thus, the next sixty-byte group data would be encrypted based on SEED (2, 30).

Figure 13:
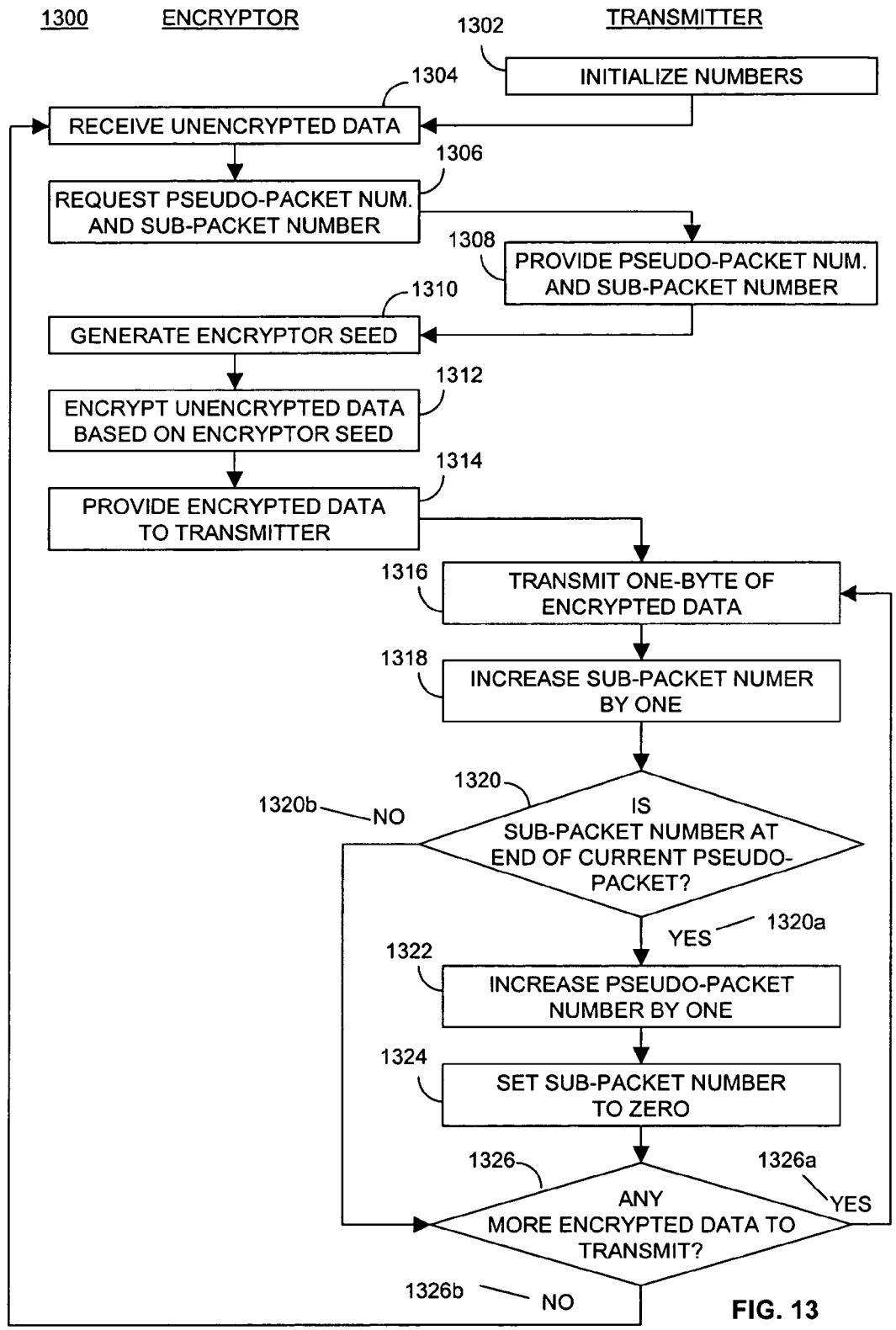
FIG. 13 is a flow chart of an exemplary method of encrypting data and transmitting encrypted data as a bit-stream.

Referring now to FIG. 13, there is shown a flow chart 1300 of an exemplary method of encrypting data and transmitting the encrypted data in a bit-stream. The encryptor methodology is shown on the left hand side of FIG. 13, and the transmitter methodology is shown on the right hand side. A transmitter initializes its pseudo-packet number and the sub-packet number 1302. In one embodiment, the pseudo-packet number can be initialized to "one" to indicate that newly produced encrypted data currently fall within the first pseudo-packet, and the sub-packet number can be initialized to "zero." An encryptor can receive an arbitrary amount of unencrypted data to be encrypted 1304. When the encryptor is ready to begin encrypting data, it can provide a request to the transmitter for a pseudo-packet number and a sub-packet number 1306. In response, the transmitter can access the current values for those numbers and provide those values to the encryptor 1308 or to an encryptor seed generator, which can be separate from or part of the encryptor. The encryptor or the seed generator can then generate the encryptor seed 1310 based on the received pseudo-packet number and sub-packet number. The encryptor then uses the encryptor seed to encrypt the unencrypted data 1312 and provides the resulting encrypted data to the transmitter 1314.

In the embodiment of FIG. 13, the transmitter communicates encrypted data to a receiver in a bit-stream. One of ordinary skill in the field of digital communications will recognize that while the transmitter can transmit the encrypted data one bit at a time, a transmitter can also transmit a group of bits at a time using what is known as "symbols," where each distinct group of bits is represented by a different symbol. If the transmitter communicates one bit at a time, then each bit in the stream will be spaced the same amount of time apart, so that the receiver can read the stream at a fixed frequency. Similarly, if the transmitter communicates a group of bits at a time using symbols, each symbol in the stream will be spaced the same amount of time apart, so that the receiver can read the stream of symbols at a fixed frequency. The exemplary transmitter of FIG. 13 transmits one-byte (e.g., eight bits) of encrypted data at a time 1316, and thus, communicates the encrypted data using symbols. Because the transmitter communicates the symbols at a fixed frequency, the transmitter therefore must update the pseudo-packet number and sub-packet number 1318-1324 after transmitting a symbol and before transmitting the next symbol. As shown in FIG. 13, after the transmitter communicates one-byte of encrypted data 1316, it increases the sub-packet number by "one" 1318 and determines whether the sub-packet number is at the end of the current pseudo-packet 1320. If so 1320a, the transmitter increases the pseudo-packet number by "one" 1322 and resets the sub-packet number to "zero" 1324. In both cases 1320a, 1320b, the transmitter determines whether there is still more encrypted data to communicate 1326. If there is more data to communicate 1326a, the transmitter again transmits one-byte of encrypted data 1316 and repeats the pseudo-packet number and sub-packet number update process. If there is no more encrypted data to decrypt 1326b, the encryptor can wait to receive more unencrypted data 1304.

Figure 14A:
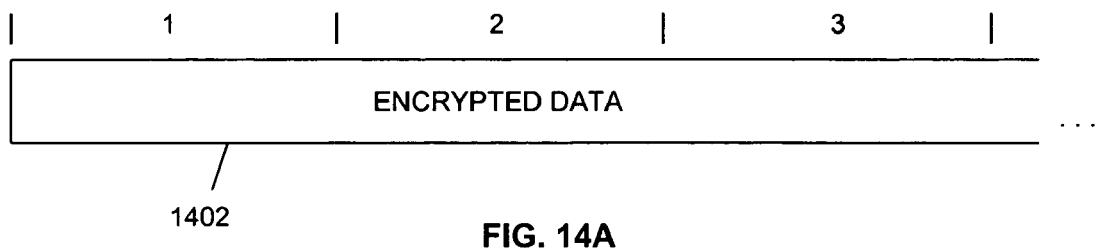
FIGS. 14A-14B are diagrams of a bit-stream before and after the introduction of a time gap and FIG. 14C is a diagram of a bit stream wherein bits are lost.
Figure 14B:
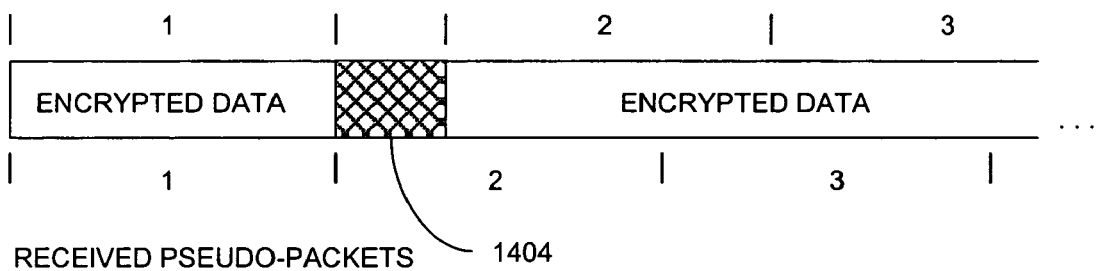
Figure 14C:
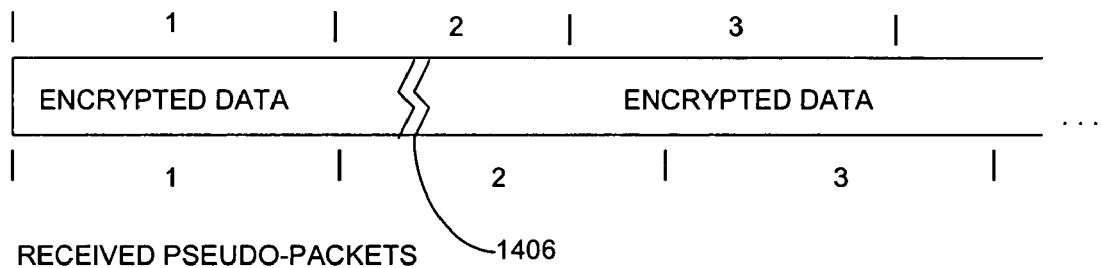

As the bit-stream is communicated to the receiver, the bits and symbols in the stream, like packets, are susceptible to corruption by noise. However, the receiver reads bits/symbols from the stream at a fixed frequency regardless of whether the bits/symbols have been corrupted. Accordingly, even though the received encrypted data may not be entirely correct, the decryptor will continue to be synchronized. Referring now to FIGS. 14A and 14B, a problem can occur during transmission of encrypted data in a bit-stream 1402 when heavy traffic and/or equipment failure causes the bit-stream to be re-routed to a different path to the receiver. The re-routing can take a certain amount of time to occur, which results in the introduction of a "time gap" 1404 into the bit-stream received by the receiver that does not correspond to any encrypted data 1402. However, the receiver is unaware of the re-routing and continues to read incoming "data" at a fixed frequency during the gap 1404. The receiver is not actually receiving encrypted data and is, in effect, erroneously increasing its sub-packet number and/or pseudo-packet number. As a result, the receiver pseudo-packet number and/or sub-packet number can become mismatched with respect to the transmitter pseudo-packet boundaries in the bit-stream, as shown in FIG. 14B, such that the receiver may regard the middle (or another portion) of a transmitted pseudo-packet as the beginning of a received pseudo-packet. In another scenario, as shown in FIG. 14C, a problem can occur where bits in a bit-stream are lost 1406, which can happen when, for example, the frequency at which the receiver reads the data "slips." Thus, a receiver cannot be relied upon to know the correct boundaries of the pseudo-packets in a bit-stream. Accordingly, forming a receive-side label containing what a receiver regards as an initial portion of a received pseudo-packet can be ineffective.

Figure 15A:
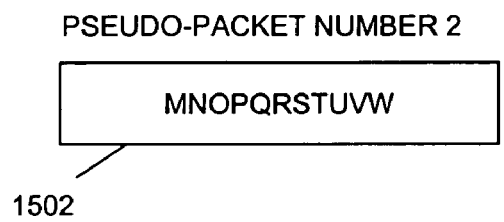
FIGS. 15A-15C are diagrams of a transmit-side label containing an initial portion of a pseudo-packet and a receive-side label containing the entirety of a received pseudo-packet.
Figure 15B:
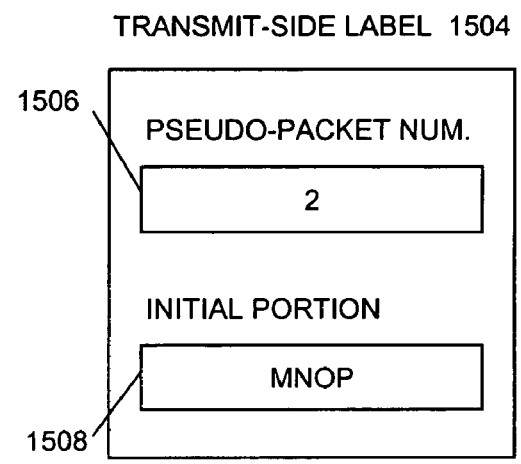
Figure 15C:
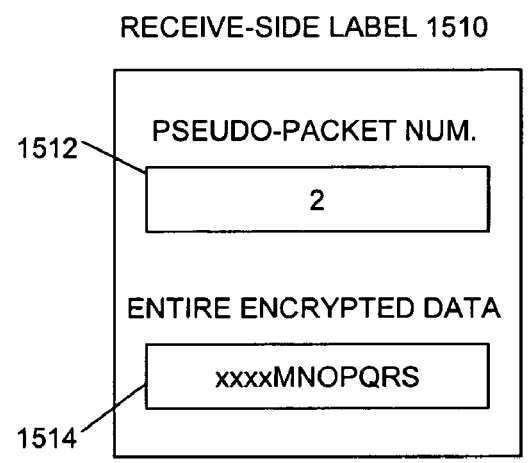

Referring now to FIG. 15A, there is shown a pseudo-packet number "two" 1502 containing the encrypted data "MNOPQRSTUVW." As shown in FIG. 15B, the transmitter can form a transmit-side label 1504 containing the transmitter pseudo-packet number 1506 and an initial portion of the corresponding pseudo-packet encrypted data 1508. Suppose that this initial portion 1508 is "MNOP." Referring again to the illustrated example in FIG. 14B, a time gap can be introduced into the bit-stream containing pseudo-packet number "two" during transmission, such that the a time gap is introduced immediately before pseudo-packet number "two" in the bit-stream. Accordingly, the receiver can be unaware of the time gap and can regard the time gap as being part of pseudo-packet number "two." Thus, referring again to FIG. 15B, the initial portion "MNOP" of the transmitted pseudo-packet number "two" 1508 now appears in the middle of the received pseudo-packet number "two." In one embodiment as shown in FIG. 15C, a receive-side label 1510 can be formed to contain the entirety of the encrypted data in a received pseudo-packet 1514. Accordingly, although a received encrypted data 1514 may contain a time gap, the time gap "xxxx" can be stored in a receive-side 1510 label along with a portion of the actual, transmitted pseudo-packet "MNOPQRS". When the transmit-side label 1504 arrives at the receiver, the receiver can determine whether the encrypted data portion "MNOP" in the transmit-side label 1508 appears anywhere within the stored pseudo-packet 1514 of a receive-side label 1510. Since the receive-side labels contain the entirety of received pseudo-packets, the receiver can find "MNOP" 1508 in a portion of received encrypted data 1514.

Figure 16:
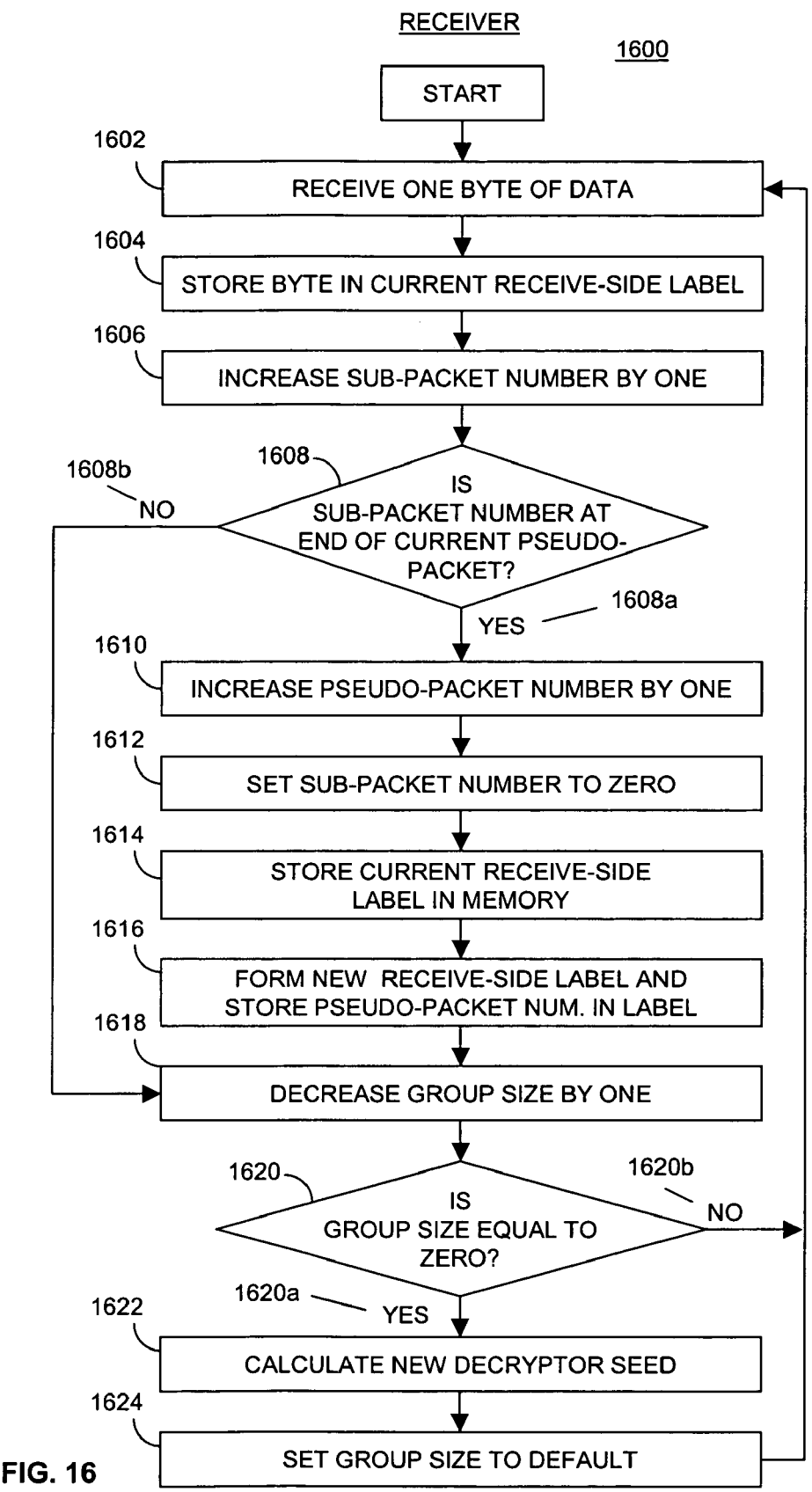
FIG. 16 is a flow chart of an exemplary method of receiving encrypted data from a bit-stream and maintaining receiver parameters.

Referring now to FIG. 16, shown is a flow chart 1600 of an exemplary method of receiving encrypted data from a bit-stream. The receiver can be coordinated with the transmitter such that the receiver receives symbols at a fixed frequency. In the exemplary method of FIG. 16, each symbol represents one-byte of encrypted data 1602. The received byte of encrypted data is stored in the current receive-side label 1604, and the sub-packet number is increased by "one" 1606. The receiver can determine whether the received byte is the last one of the current pseudo-packet 1608. If the sub-packet number has reached the end of the current pseudo-packet 1608a, the pseudo-packet number is increased by "one" to designate the next pseudo-packet 1610, and the sub-packet number is reset to "zero" 1612. Also, the current receive-side label is stored in memory 1614, and a new receive-side label is formed to contain the updated pseudo-packet number 1616. In either case 1608a, 1608b, the group size number is decreased by one to reflect that a byte of encrypted data was received 1618. The receiver can determine whether a new decryptor seed needs to be calculated by checking if the updated group size is zero 1620. If the group size number is equal to zero 1620a, the receiver calculates a new decryptor seed 1622, resets the group size value to a default group size value 1624, and waits to receive the first byte of encrypted data for the new decryptor seed 1602. If the group size value is not zero 1620b, the receiver can wait to receive another byte of encrypted data for the current decryptor seed 1602. Note that the group size may not reach zero at a pseudo-packet boundary. Accordingly, as shown in FIG. 16, a receiver can determine when a pseudo-packet boundary is reached 1608 separately from when it determines if the group size is zero 1620.

Figure 17A:
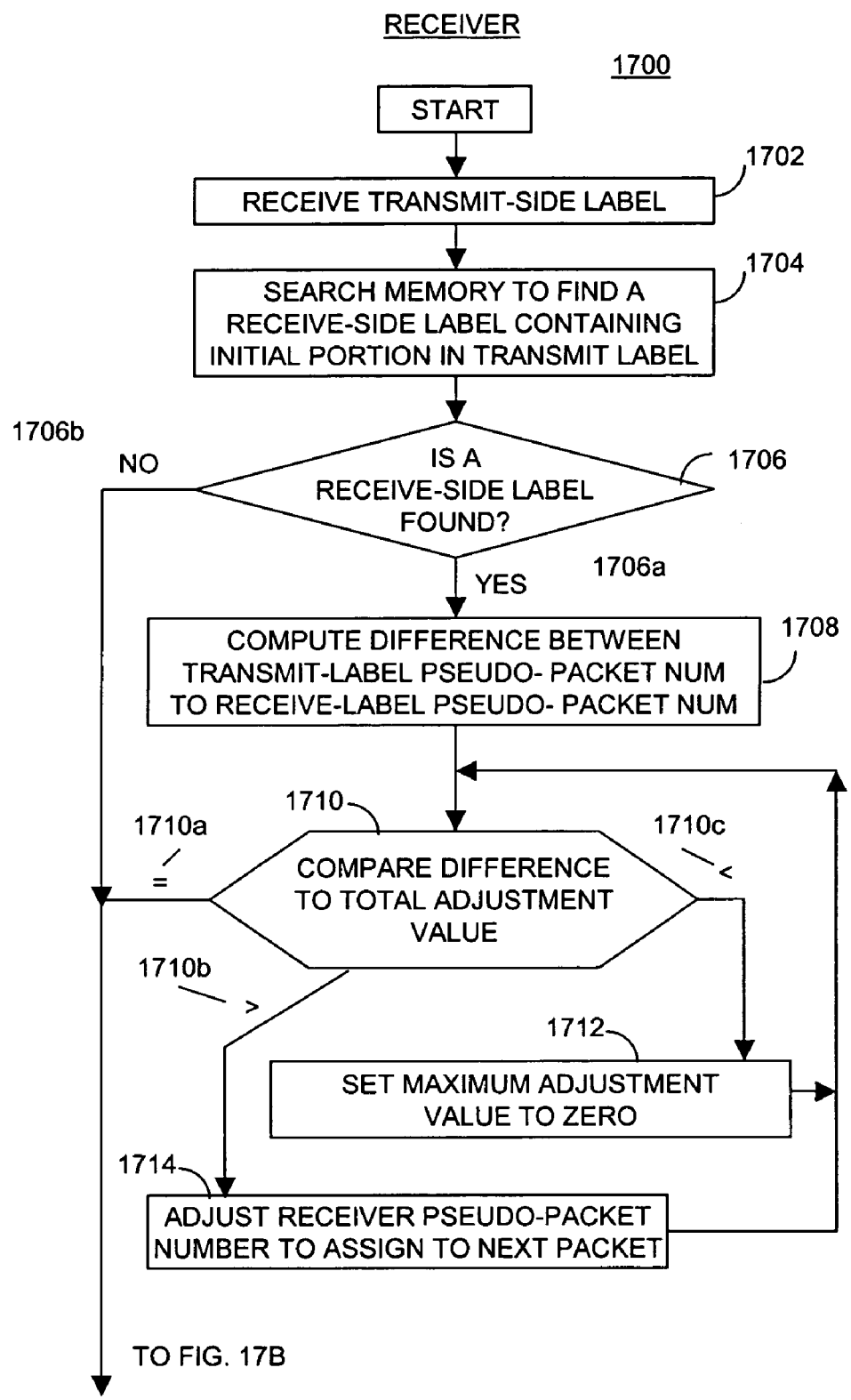
FIGS. 17A-17B are flow charts of an exemplary method of adjusting a pseudo-packet number and adjusting a pseudo-packet boundary; and, FIG. 18 is a diagram of a cryptographic system having a queue for receiving encrypted data.

Referring now FIG. 17A, a receiver for a bit-stream can recognize when a decryptor is unsynchronized by receiving a transmit-side label 1702 in much the same way as previously discussed with respect to FIG. 11A. Since the receive-side labels each contain an entire pseudo-packet, the transmit-side label data portion will form only a portion of the entire pseudo-packet, and because of the possible insertion of time gaps, this transmit-side label data portion may not appear at the beginning of a receive-side label pseudo-packet. Thus, rather than searching for a receive-side label containing the same initial portion of encrypted data as the transmit-side label, the receiver searches for a receive-side label having a pseudo-packet that contains the transmit-side label data portion anywhere therein 1704. When a corresponding receive-side label is located for a transmit-side label 1706a, the difference between the transmit-side label pseudo-packet number and the receive-side label pseudo-packet number 1708 can be compared to the total adjustment value 1710. In contrast to packet-based communication of encrypted data, where a receiver packet number can be less than what it should be because of lost packets, a receiver pseudo-packet number for a bit-stream can be greater than what it should be because of the introduction of time gaps. Accordingly, when the receiver recognizes that the decryptor is unsynchronized and when greater, e.g., 1710b, it can attempt to resynchronize the decryptor by decreasing its receiver pseudo-packet number by the magnitude of the difference between the transmit-side label pseudo-packet number and the corresponding receive-side label pseudo-packet number, and also adjust the sub-packet number and group size accordingly 1714. When the pseudo-packet number adjustment is complete, as exemplified by 1710a, the exemplary method can continue to FIG. 17B and determine whether the transmit-side label data portion was offset from the beginning of the pseudo-packet in the receive-side label 1716. The receiver can maintain a byte adjustment value for adjusting a pseudo-packet boundary that is similar to the total adjustment value for adjusting a pseudo-packet number. To adjust a pseudo-packet boundary, the receiver can compare the offset to the byte adjustment value 1718. If the two values are the same 1718a, no adjustment is needed. If the offset is greater than the byte adjustment value 1718b, the receiver can discard a number of newly received bytes equal to (offset−byte adjustment value) 1722, and set the byte adjustment value to equal the offset 1724. If the offset is less than the byte adjustment value 1718c, the receiver can discard a number of newly received bytes equal to (offset) 1720, and set the byte adjustment value to equal the offset 1724.

Figure 17B:
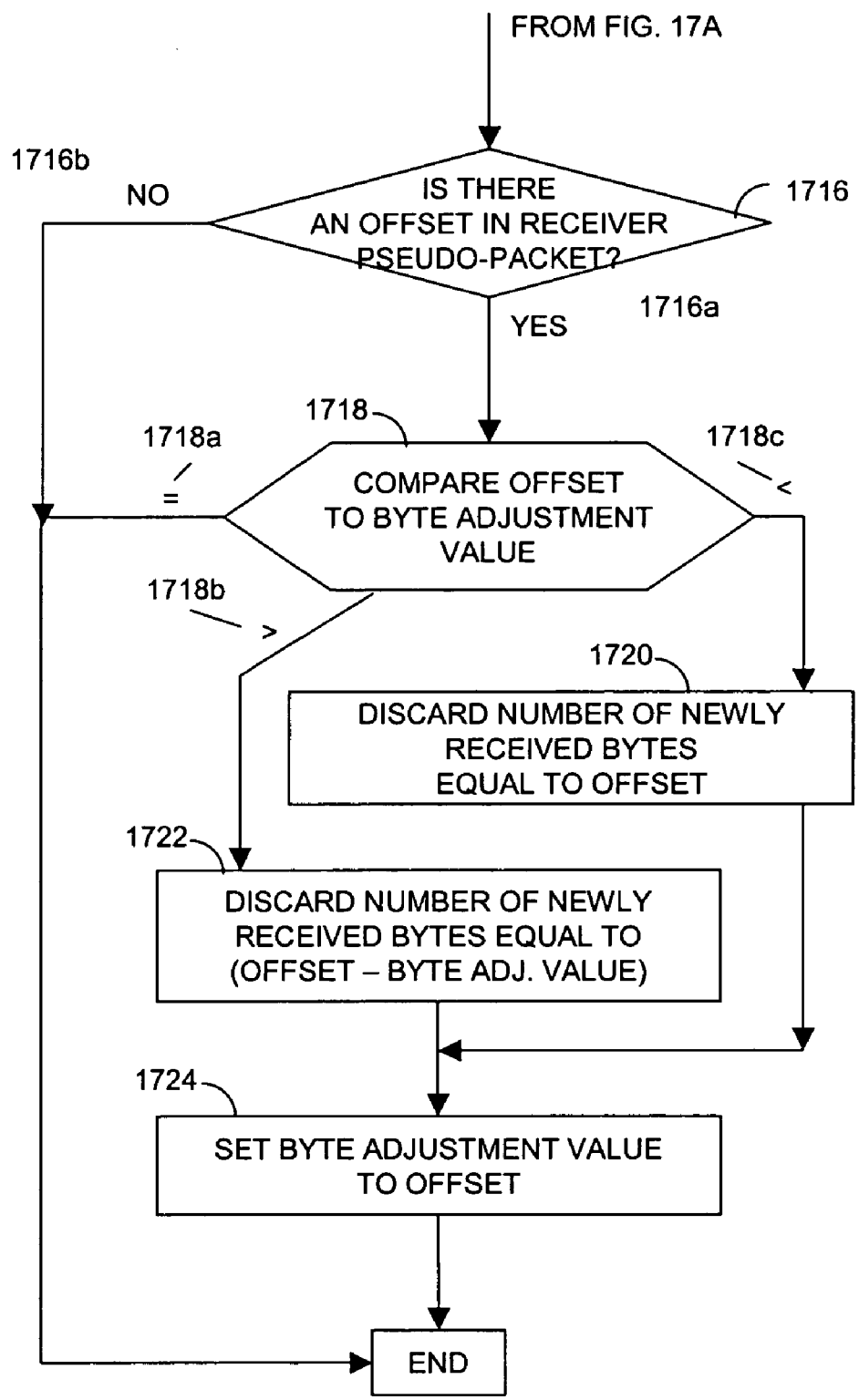

The exemplary method of FIGS. 17A and 17B occurs while encrypted data from the bit-stream is constantly arriving. While the transmit-side label can be received at any time, and the receiver can search for the corresponding receive-side label at any time, in one embodiment, adjustments to the receiver pseudo-packet number 1714 may be made only after one pseudo-packet has been completely received and before the first byte of the next pseudo-packet is received. Similarly, adjustments to the pseudo-packet boundary 1720-1722 can be made after one pseudo-packet has been received and while the next pseudo-packet is being received.

The disclosed technology is not limited to the illustrations and descriptions provided herein, but includes other embodiments that fall within the scope of the disclosed technology. For example, referring again to FIGS. 15A through 15C, the initial data portion 1508 in the transmit-side label 1504 may not appear in a single receive-side label because a time gap can cause the data portion 1508 to fall across a pseudo-packet boundary. In such a situation, one receive-side label will contain an initial part of the data portion 1508 and the next receive side label will contain the remaining part. In one embodiment, if a receiver has identified an initial part of a transmit-side label data portion 1508 at the end of a receive-side label pseudo-packet, it can search for the remaining part at the beginning of the next receive-side label pseudo-packet.

Figure 18:
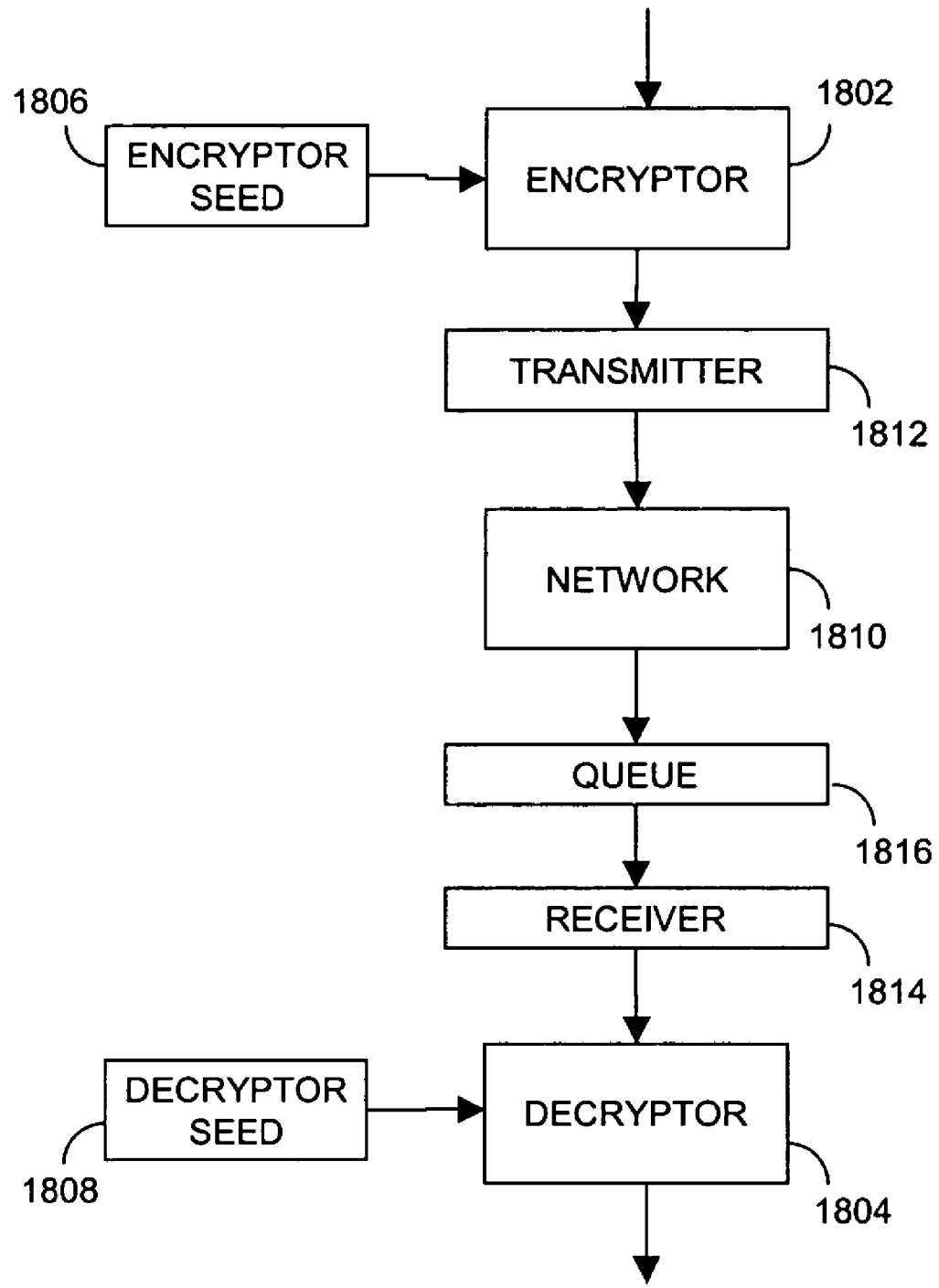

In one embodiment, a receiver may not be able to resynchronize the decryptor before receiving another packet or the first byte of the next pseudo-packet. As shown in FIG. 18, in one embodiment, a queue can receive and store packets and/or bytes from a bit-stream and can provide the encrypted data to a receiver when the receiver indicates that it is ready. The depicted functions, namely: encryptor 1802, encryptor seed 1806, transmitter 1812, network 1810, queue 1816, receiver 1814, decryptor 1804 and decryptor seed 1808 operate and cooperate in FIG. 18 as previously discussed and similarly-named functions described earlier.

Accordingly, what has been described is a system and method of encrypting and decrypting data based on a packet number/pseudo-packet number and a sub-packet number, and a system and method of adjusting a receiver packet number/pseudo-packet number by comparing a transmit-side label to a receive-side label stored in memory.

References to memory, unless otherwise specified, can include one or more processor-readable and accessible memory elements and/or components that can be internal to a processor-controlled device, external to a processor-controlled device, and can be accessed via a wired or wireless network using a variety of communications protocols, and unless otherwise specified, can be arranged to include a combination of external and internal memory devices, where such memory can be contiguous and/or partitioned based on the application.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

Any computer program(s) can be implemented using one or more high level procedural or object-oriented programming languages to communicate with a computer system; however, the program(s) can be implemented in assembly or machine language, if desired. The language can be compiled or interpreted.

Many additional changes in the details, materials, and arrangement of parts, herein described, can be made by those skilled in the art.

What is claimed is:

1. A method of securely communicating data, the method comprising:
    first receiving bytes of encrypted data in a bit-stream;
    determining a current pseudo-packet number based on a previous pseudo-packet number for previously received encrypted data;
    storing said encrypted data as a pseudo-packet, and storing said current pseudo-packet number associatively with said pseudo-packet in a database including stored pseudo-packets and associated pseudo-packet numbers;
    receiving a transmission containing second encrypted data and a second pseudo-packet number;
    searching said database to obtain a match between said second encrypted data and a portion of one pseudo-packet of said stored pseudo-packets;
    adjusting said current pseudo-packet number based on a relation between said second pseudo-packet number and a pseudo-packet number associated with said one pseudo-packet to obtain an adjusted pseudo-packet number wherein said adjusting further comprises:
        determining an offset of said portion from a beginning of said one pseudo-packet;
        comparing said offset to a byte adjustment value for incrementing said current pseudo-packet number; and
        when said offset is not equal to said byte adjustment value, discarding a number of bytes of said encrypted data and setting said byte adjustment value to equal said offset; and
    returning to said first receiving using the adjusted pseudo-packet number as the previous pseudo-packet number when additional data is communicated.

2. The method of claim 1, wherein said discarding further comprises:
    discarding a number of bytes equal to said offset when said offset is less than said byte adjustment value; and
    discarding a number of bytes equal to said offset less said byte adjustment value when said offset is greater than said byte adjustment value.

* * * * *